(12) United States Patent
Koga et al.

(10) Patent No.: US 8,363,800 B2
(45) Date of Patent: Jan. 29, 2013

(54) COMMUNICATION APPARATUS, INTEGRATED CIRCUIT, AND COMMUNICATION METHOD

(75) Inventors: Hisao Koga, Fukuoka (JP); Nobutaka Kodama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 160 days.

(21) Appl. No.: 13/039,515

(22) Filed: Mar. 3, 2011

(65) Prior Publication Data

US 2011/0150104 A1 Jun. 23, 2011

Related U.S. Application Data

(62) Division of application No. 11/545,779, filed on Oct. 11, 2006, now Pat. No. 7,924,990.

(30) Foreign Application Priority Data

Oct. 12, 2005 (JP) .................................. 2005-297529
Apr. 18, 2006 (JP) .................................. 2006-114191

(51) Int. Cl.
*H04M 11/00* (2006.01)

(52) U.S. Cl. ............... 379/93.36; 379/90.01; 379/93.07; 370/482

(58) Field of Classification Search ............... 379/90.01, 379/93.05, 93.07, 93.36; 370/330, 310.1, 370/336, 342, 347, 447, 461, 468
See application file for complete search history.

(56) References Cited

U.S. PATENT DOCUMENTS

| | | | |
|---|---|---|---|
| 5,694,436 A | 12/1997 | Huang | |
| 5,768,318 A | 6/1998 | Mestdagh | |
| 5,809,030 A | 9/1998 | Mestadg | |
| 5,907,560 A | 5/1999 | Spruyt | |
| 6,072,810 A | 6/2000 | Van Der Putten | |
| 6,088,386 A | 7/2000 | Spruyt | |
| 6,202,178 B1 | 3/2001 | Spruyt | |
| 6,240,129 B1 | 5/2001 | Reusens | |
| 6,327,273 B1 | 12/2001 | Van Der Putten | |
| 6,370,156 B2 | 4/2002 | Spruyt | |
| 6,754,235 B2 | 6/2004 | Van Der Putten | |
| 6,912,233 B2 | 6/2005 | Spruyt | |
| 7,035,288 B2 | 4/2006 | Spruyt | |
| 2001/0014101 A1 | 8/2001 | Spruyt | |
| 2002/0186714 A1 | 12/2002 | Mestdagh | |
| 2003/0128660 A1* | 7/2003 | Ito et al. ........................ | 370/210 |

(Continued)

FOREIGN PATENT DOCUMENTS

| | | |
|---|---|---|
| EP | 1357718 | 10/2003 |
| JP | 2000/165304 | 6/2000 |

(Continued)

OTHER PUBLICATIONS

Extended European Search Report dated Mar. 15, 2011.

(Continued)

*Primary Examiner* — Melur Ramakrishnaiah
(74) *Attorney, Agent, or Firm* — Dickinson Wright PLLC

(57) ABSTRACT

A communication apparatus repeatedly outputs a first multi-carrier signal SS during predetermined periods T1, T2, T3, . . . , and outputs a second multi-carrier signal RS whose phase vector is different from that of the first multi-carrier signal SS, at a predetermined timing based on the first multi-carrier signal SS. The communication apparatus further detects the second multi-carrier signal RS output from another communication apparatus, which uses a different communication method from the communication apparatus. Accordingly, both communication apparatuses can differentiate the first multi-carrier signal SS from the second multi-carrier signal RS without performing relatively cumbersome modulation and other processes.

9 Claims, 20 Drawing Sheets

U.S. PATENT DOCUMENTS

| | | |
|---|---|---|
| 2003/0156014 A1* | 8/2003 | Kodama et al. .......... 340/310.01 |
| 2004/0174907 A1 | 9/2004 | Van Der Putten |
| 2004/0208139 A1 | 10/2004 | Iwamura |
| 2005/0190785 A1 | 9/2005 | Yonge |
| 2006/0153324 A1 | 7/2006 | Spruyt |
| 2006/0165047 A1 | 7/2006 | Kodama |

FOREIGN PATENT DOCUMENTS

| | | |
|---|---|---|
| JP | 2002/237701 | 8/2002 |
| JP | 2005-033639 | 2/2005 |
| WO | 03/009083 | 1/2003 |
| WO | 2004/015907 | 2/2004 |

OTHER PUBLICATIONS

International Search Report dated Dec. 12, 2006.
European Search Report dated Aug. 12, 2010.
D. Mestdagh, et al., "A Method to Reduce the Probability of Clipping in DMT-Based Transceivers," IEEE Transactions on Communications, vol. 44 No. 10, pp. 123-1238, Oct. 1996.

* cited by examiner

FIG. 5
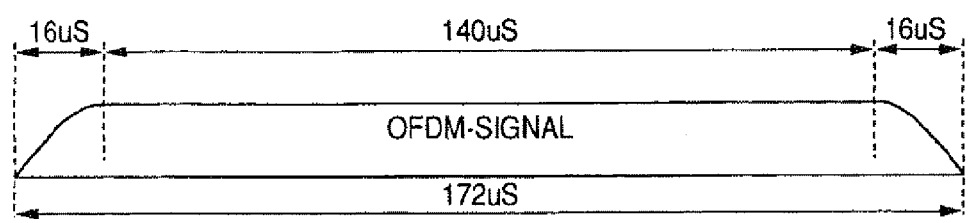
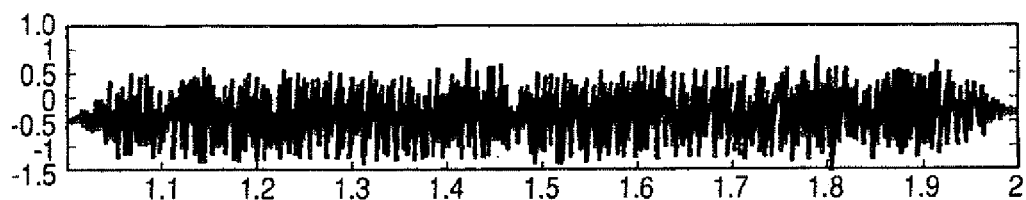
FIG. 6
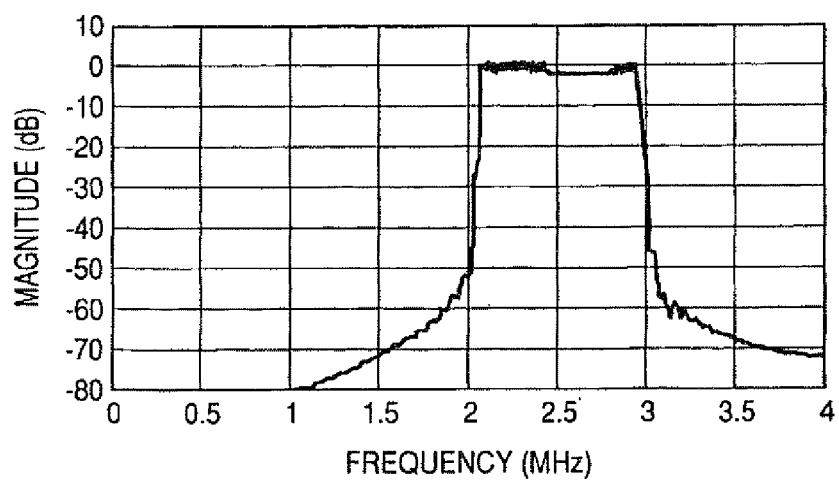

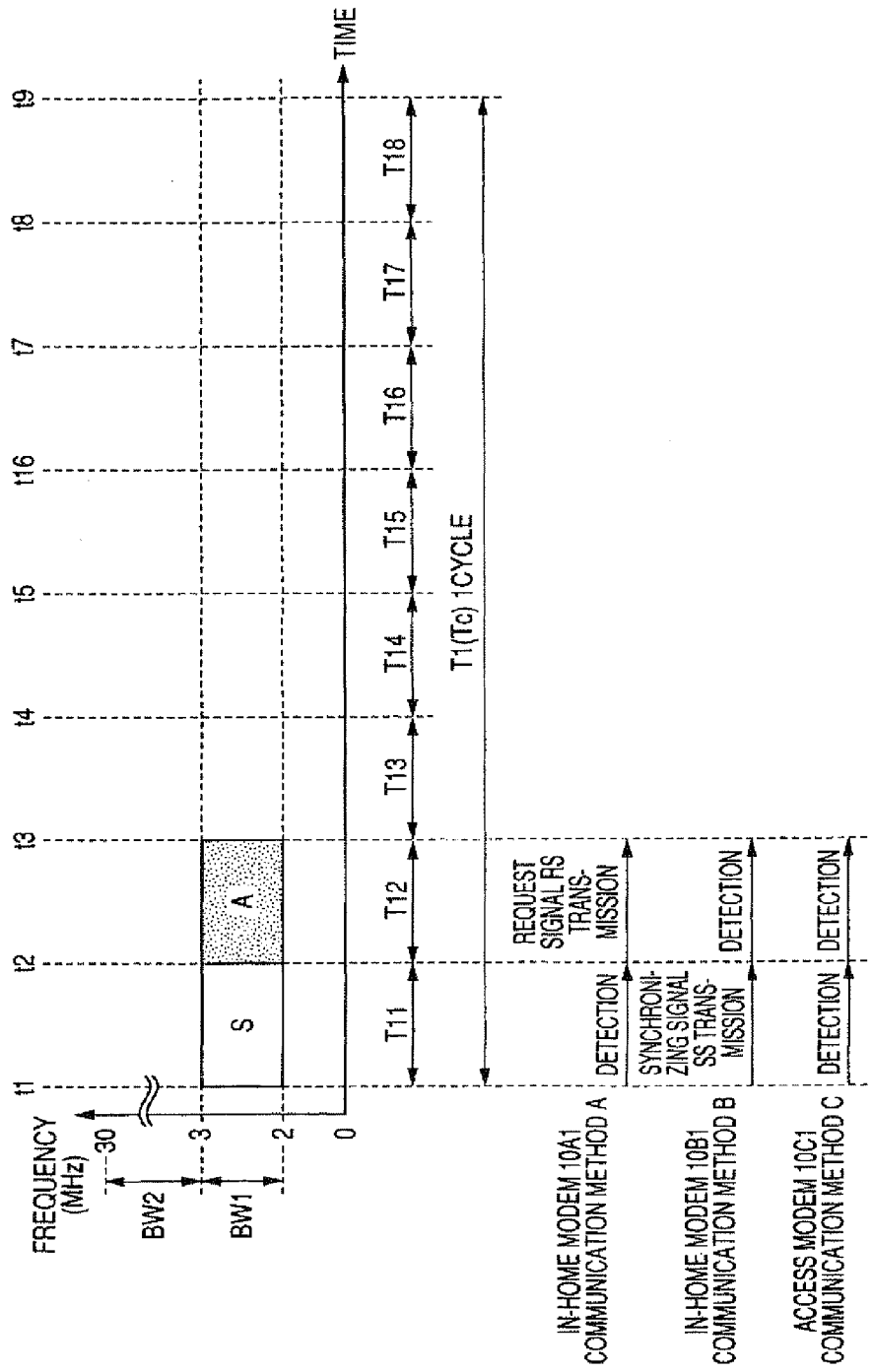

COMMUNICATION APPARATUS, INTEGRATED CIRCUIT, AND COMMUNICATION METHOD

This is a divisional application of application Ser. No. 11/545,779 filed Oct. 11, 2006, which is based on Japanese Application No. 2005-297529 filed Oct. 12, 2005, and Japanese Application No. 2006-114191 filed Apr. 18, 2006, the entire contents of each which are incorporated by reference herein.

INCORPORATION BY REFERENCE

This application is related to the following patent which is hereby incorporated by reference in its entirely: U.S. Pat. No. 6,944,232, RECEIVING APPARATUS AND METHOD FOR DIGITAL MULTI-CARRIER TRANSMISSION, Inventors: Hisao Koga et al., filed on Feb. 19, 2004.

BACKGROUND

1. Field of the Invention

The present invention relates to a communication apparatus, an integrated circuit and a communication method that are capable of easily detecting signals output from other communication apparatuses, which use different communication methods and are connected to a common transmission line, while avoiding interference between signals without performing relatively cumbersome modulation and other processes.

2. Description of Related Art

With the recent development of communication technology, PLC (Power Line Communication) has been gaining attention. PLC is a technology that performs multi-carrier communications among a plurality of terminal apparatuses, using power lines installed indoors as transmission lines, and utilizes an OFDM (Orthogonal Frequency Division Multiplexing) system (e.g., Japanese Patent Laid-Open Publication 2000-165304). OFDM is a modulation method for multi-carrier data transmission, by which a plurality of carriers are transmitted in a multiplex way on a frequency axis. OFDM uses an FFT (Fast Fourier Transform) or a DWT (Discrete Wavelet Transform) to narrow frequency intervals of multi-carriers and to closely space a plurality of carriers in such a way that they partially overlap and yet do not interfere with one another. OFDM thus enables broadband transmission by efficiently using a narrow frequency spectrum.

For multi-carrier communications, such as power line communications, a technology is proposed to suppress interference in such manner that a phase vector flattens time waveform levels to prevent occurrence significant peak. In this technology, when a time waveform has no significant peak, the phase of each sub-carrier is rotated using the phase vector of default. However, when the significant peak is detected, the phase vector is changed until a phase vector that generates no waveform peak is found, and the phase of each sub-carrier is thus rotated according to the changed phase vector (Denis J. G. Mestdagh and Paul M. P. Spruyt, "A Method to Reduce the Probability of Clipping in DMT-Based Transceivers", IEEE Transactions on Communications, Vol. 44, No. 10, pp. 1234-1238, 1996). Such a technology for suppressing peaks is essential for reducing the design difficulty for a power amplifier for multi-carrier communications.

Usually, when the specifications of the same communication method are used, the specifications of communication apparatuses connected to each network are generally common even for a case where different logical networks are formed using a network key, or the like. This way, the communication apparatuses can detect (carrier sense) signals transmitted between different networks, on a physical layer level of the communication apparatuses, and it is possible to prevent interference between signals using a CSMA (Carrier Sense Multiple Access), thus enabling smooth communication even for relatively closely located different networks.

However, different manufacturers may use different specifications for a communication method such as a communication protocol, a modulation scheme and a frequency band. Such communication technology is highly likely to be used in an environment where a plurality of types of communication methods are mixed in the same location. For instance, users (communication apparatus users) in collective housing such as an apartment or a condominium do not necessarily use communication apparatuses (e.g., modems) of the same manufacturer. in this case, a plurality of types of communication apparatuses independently made by a plurality of manufacturers may be simultaneously connected to a common power line.

When the a plurality of types of communication apparatuses are connected to the common power line, a communication apparatus cannot demodulate a signal transmitted from a different communication apparatus using a different type of communication method. Therefore, such a signal is acknowledged merely as noise. Accordingly, although the plurality of types of communication apparatuses use the same frequency band, even the existence of other communication apparatuses is not acknowledged. This causes interference between signals transmitted from the plurality of types of communication apparatuses, thereby causing communication errors. In other words, the plurality of types of communication apparatuses sometimes cannot coexist on the common power line.

On the other hand, when each communication apparatus is set up to perform modulation, signals transmitted from other communication apparatuses can be differentiated. However, modulation processes performed to allow the plurality of types of communication apparatuses to coexist have an adverse effect of increasing the workload.

SUMMARY

An object of embodiments described in the following is to provide a communication apparatus, an integrated circuit and a communication method that are capable of easily detecting signals output from other communication apparatuses, even when a plurality of types of communication apparatuses using different communication methods are connected to a common transmission line, without performing relatively cumbersome modulation and other processes.

A first communication apparatus, which is described in the embodiments, is a communication apparatus is capable of connecting to a power line connected to at least a first communication apparatus and a second communication apparatus. The first communication apparatus is capable of performing a data transmission with said communication apparatus. The second communication apparatus is incapable of performing the data transmission with said communication apparatus. The communication apparatus includes a receiver, a carrier detector, a channel setting unit and a transmitter. The receiver receives a signal from the second communication apparatus. The carrier detector detects a predetermined data in the signal. The channel setting unit sets at least one of time slot and frequency band used for the first communication apparatus when the carrier detector detects the predetermined data, the time or the frequency band used for the first communication apparatus being different from a time or a frequency band used for the second communication apparatus. The transmitter performs the data transmission with the first communication apparatus in at least one of the time and the frequency band used for the first communication apparatus.

An integrated circuit, which is described in the embodiments, is an integrated circuit is capable of connecting to a power line connected to at least a first communication apparatus and a second communication apparatus. The first communication apparatus is capable of performing a data transmission with said integrated circuit. The second communication apparatus is incapable of performing the data transmission with said integrated circuit. The integrated circuit includes a receiver, a carrier detector, a channel setting unit and a transmitter. The receiver receives a signal from the second communication apparatus. The carrier detector detects a predetermined data in the signal. The channel setting unit sets at least one of time and frequency band used for the first communication apparatus when the carrier detector detects the predetermined data, the time or the frequency band used for the first communication apparatus being different from a time or a frequency band used for the second communication apparatus. The transmitter performs the data transmission with the first communication apparatus in at least one of the time and the frequency band used for the first communication apparatus.

A communication method, which is described in the embodiments, is a communication method controls data transmission that a communication apparatus performs through a power line connected to at least a first communication apparatus and a second communication apparatus. The first communication apparatus is capable of performing the data transmission with said communication apparatus. The second communication apparatus is incapable of performing the data transmission with said communication apparatus. The communication method includes: receiving a signal from the second communication apparatus; detecting a predetermined data in the signal; setting at least one of time and frequency band used for the first communication apparatus when the carrier detector detects the predetermined data, the time or the frequency band used for the first communication apparatus being different from a time or a frequency band used for the second communication apparatus; and performing the data transmission with the first communication apparatus in at least one of the time and the frequency band used for the first communication apparatus.

BRIEF DESCRIPTION OF THE DRAWINGS

FIG. 2 (b) is an external perspective view of a rear side of the modem;

FIG. 5 shows a signal format of an OFDM signal;

FIG. 6 shows a signal spectrum of the OFDM signal;

FIG. 7 (b) is a time chart that employs another example of time division;

FIG. 7 (c) is a time chart that employs frequency and time division;

FIG. 8 (b) shows an example of noise level-frequency characteristics on the power line;

FIG. 9 shows time slots corresponding to request signals transmitted during control periods;

FIG. 12 (b) is a time chart that employs frequency and time division;

DETAILED DESCRIPTION

First Embodiment

The first embodiment is described in the following with reference to FIGS. 1 to 10.

Figure 1:
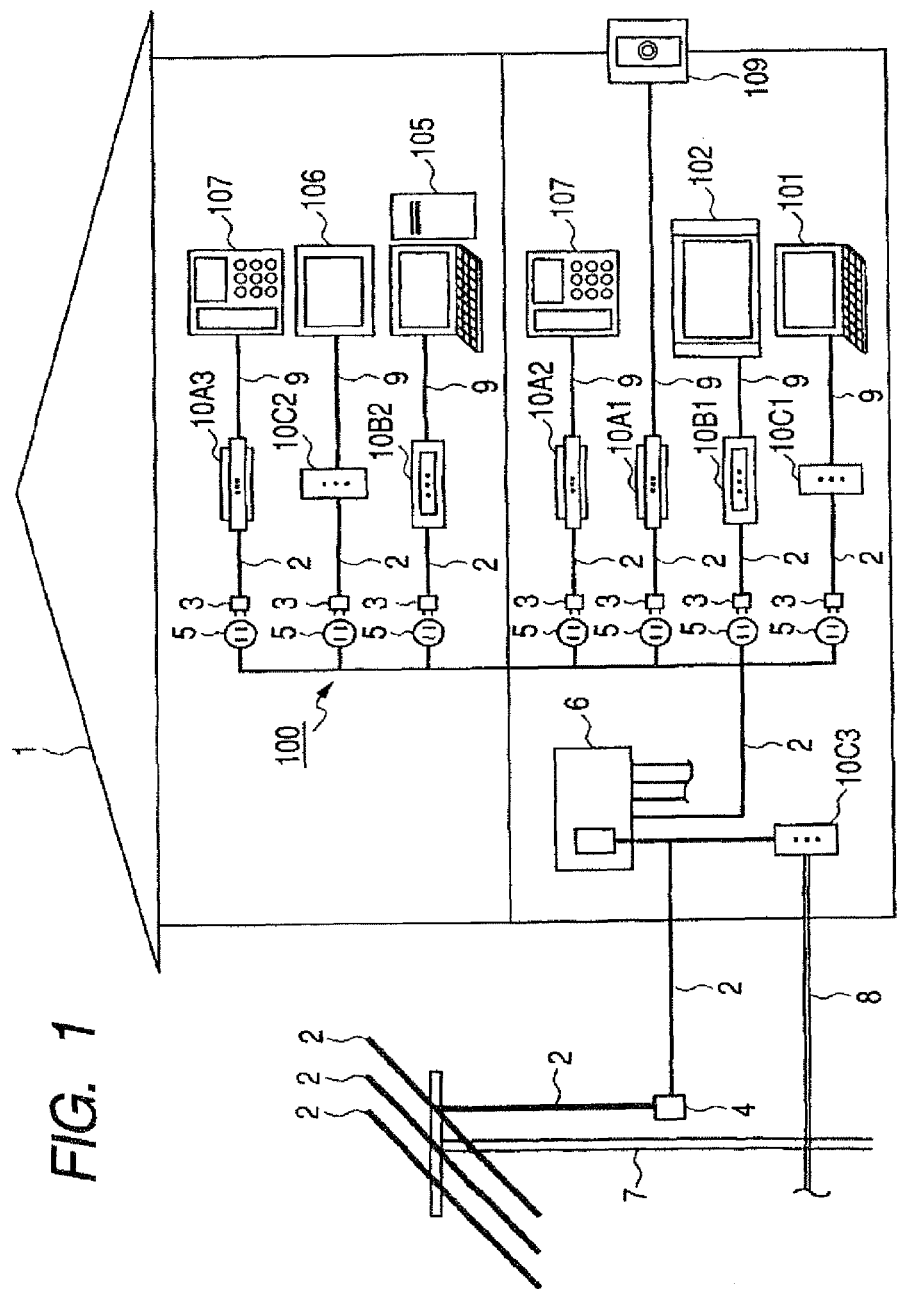
FIG. 1 is a schematic configuration view of a communication system according to a first embodiment.

FIG. 1 is a schematic configuration view of communication system 100 according to the first embodiment. As shown in FIG. 1, communication system 100 includes a network using power lines 2 as transmission lines. Power lines 2 include: power transmission cables of power pole 7, which is provided outdoors; a pull-in cable connected to the power transmission cables via transformer 4; and an interior wiring within residence 1. Power lines 2, which include the power transmission cables, are connected to power distribution panel 6 via power lines 2, which include the pull-in cable. Fiber cable 8, which is connected to an ISP (Internet Service Provider/not shown), or the like, is connected to power distribution panel 6 via modem 10C3, which functions as a communication apparatus.

Power lines 2, which are connected to power distribution panel 6, are connected to a plurality of outlets 5 installed in residence 1. A plurality of modems using different types of communication methods are connected to outlets 5 via plugs 3 and power lines 2 (e.g., VVF cables). Power lines 2 feed commercial AC voltage (e.g., 100V, 60 Hz (or 50 Hz)) to various electric appliances, although values other than 100V, 60 Hz can also be used. For instance, an AC voltage of 120V, 60 Hz is used in the U.S. and an AC voltage of 110/220V, 50 Hz is used in China, etc.

As shown in FIG. 1, modems 10A1, 10A2 and 10A3 use communication method A; modems 10B1 and 10B2 use communication method B; and modems 10C1, 10C2 and 10C3 use communication method C. All of the modems are installed in residence 1. Various electric appliances are connected to the respective modems via LAN cables 9. More specifically, intercom 109 is connected to modem 10A1; and telephone with display 107 and 107 are connected to modems 10A2 and 10A3. Television 102 is connected to modem 10B1; and server 105 is connected to modem 10B2. Portable personal computer (hereinafter simply referred to as a PC) 101 is connected to modem 10C1; and television 106 is connected to modem 10C2.

In the following description, when no particular distinction is necessary among modems 10A1, 10A2, 10A3, 10B1, 10B2, 10C1, 10C2 and 10C3, these modems are all simply referred to as "modem 10". The modem described in the present embodiment is an example of communication apparatus 10. Any device having a communication function, other than a modem, can also be used. For instance, electric appliances having a modem function (more specifically, various electric appliances 101, 102, 103, . . . shown in FIG. 1) can also be used.

In the specification, power line communication used only in housings, e.g., residences and collective housings, and other structures, e.g., factories and buildings, is defined as "in-home communication"; and power line communication (including communication methods used in buildings using such power line communication) used for outdoor power transmission cables and fiber cables is defined as "access communication". In the following, a communication system by in-home communication is simply referred to as an "in-home system"; and a communication system by access communication is simply referred to as an "access system". In FIG. 1, a communication system including modems 10A1, 10A2, 10A3, 10B1 and 10B2 belongs to the in-home system; and a communication system including modems 10C1, 10C2 and 10C3 belongs to the access system.

Figure 2A:
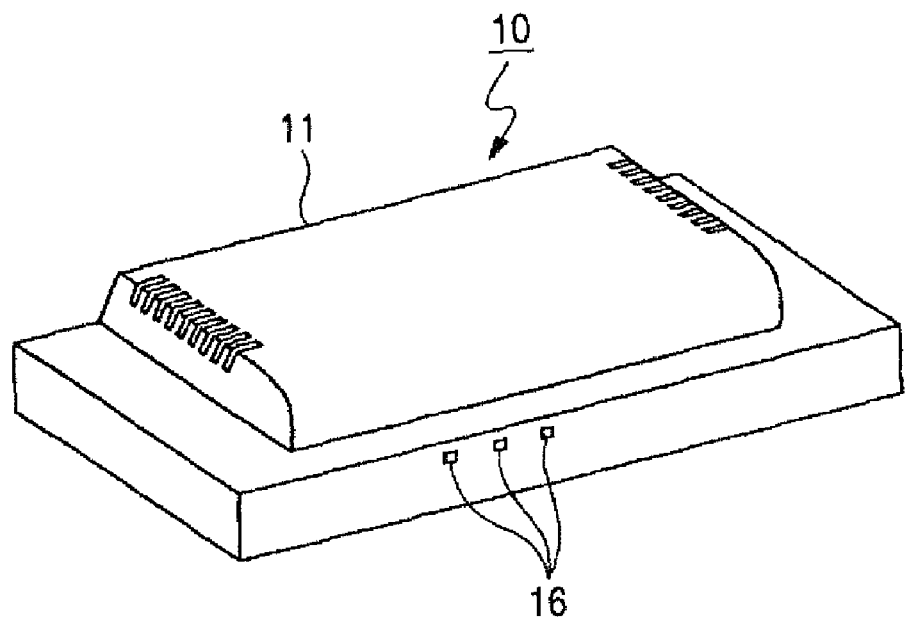
FIG. 2 (a) is an external perspective view of a front side of a modem.
Figure 2B:
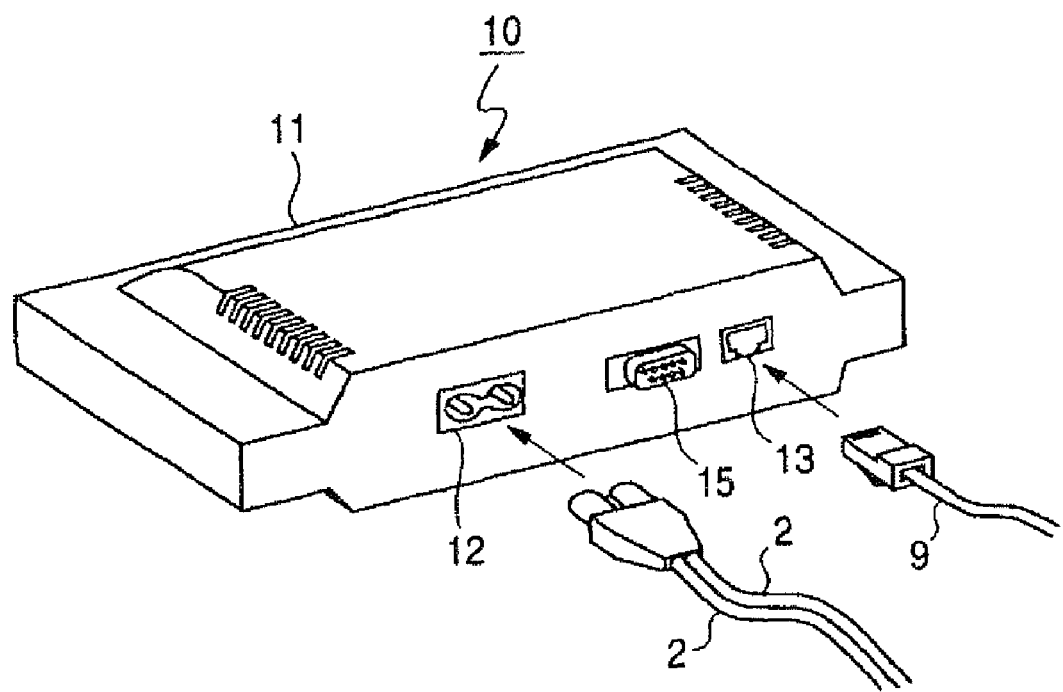

FIG. 2 (a) is an external perspective view of a front side of the modem; and FIG. 2 (b) is an external perspective view of a rear side of the modem. Modem 10 has chassis 11 shown in FIG. 2. Displays 16, such as LED (Light Emitting Diodes), are provided on the front of chassis 11. Power connector 12, LAN (Local Area Network) modular jack 13, such as RJ 45 and D-sub connector 15 are provided on the rear of chassis 11. Power lines 2, such as a parallel cable, are connected to power connector 12. LAN cable 9 is connected to modular jack 13. A D-sub cable (not shown) is connected to D-sub connector 15.

Figure 3:
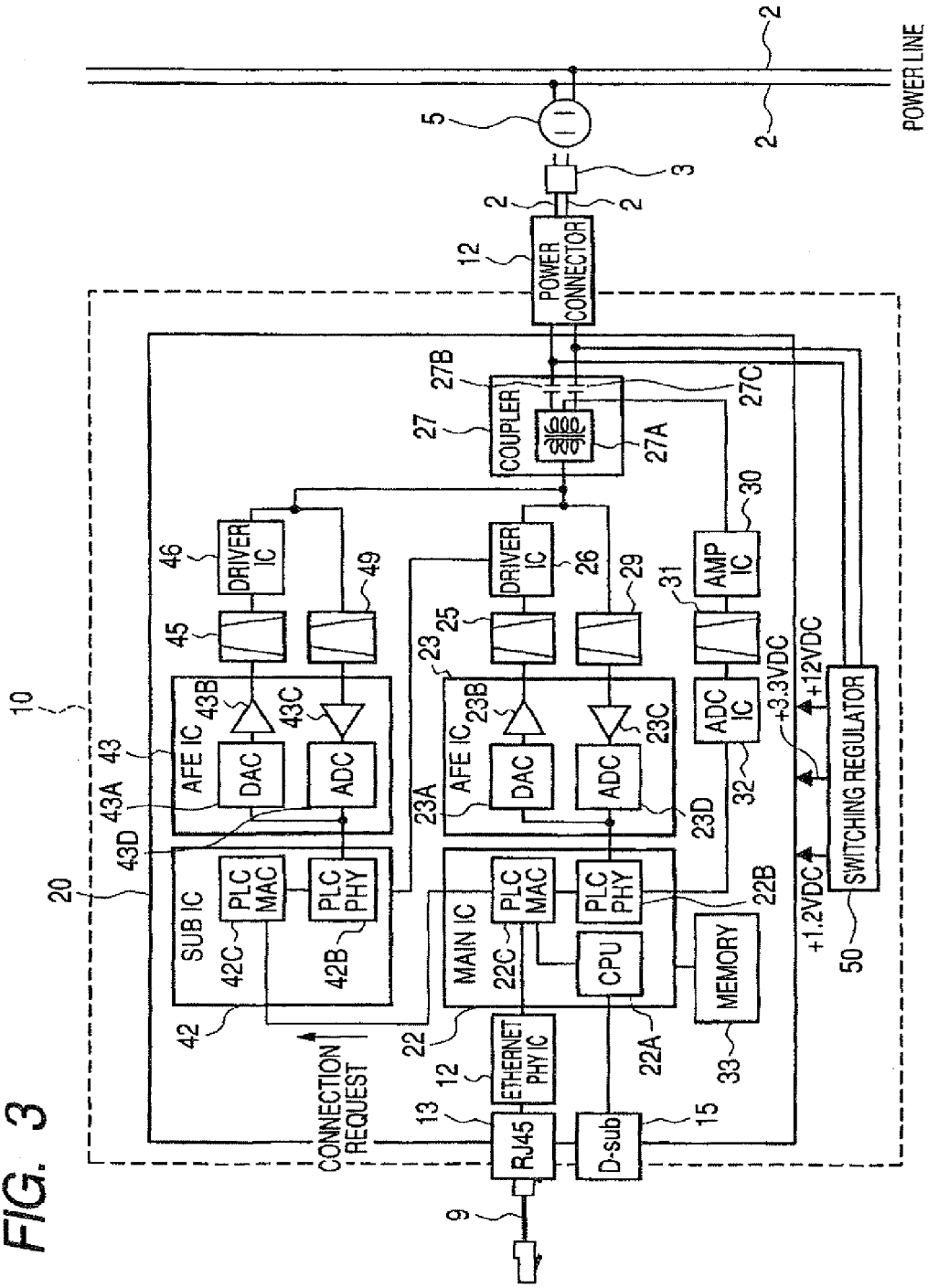
FIG. 3 is a block diagram illustrating a hardware example that constitutes the modem according to the first embodiment.

FIG. 3 is a block diagram illustrating a hardware example that constitutes modem 10 according to the first embodiment. As shown in FIG. 3, modem 10 includes circuit module 20 and switching regulator 50. Switching regulator 50 feeds various levels of voltage (e.g., +1.2V, +3.3V, +12V) to circuit module 20. Circuit module 20 includes main IC (Integrated Circuit) 22, AFE IC (Analog Front End IC) 23, band-pass filter 25, driver IC 26, coupler 27, band-pass filter 29, AMP (amplifier) IC 30, band-pass filter 31, ADC (AD converter) IC 32, memory 33 and Ethernet PHY IC 12. Power connector 12 is connected to power lines 2 via plug 3 and outlet 5.

Main IC 22 includes: CPU (Central Processing Unit) 22A, PLC MAC (Power Line Communication Media Access Control layer) block 22C and PLC PHY (Power Line Communication Physical layer) block 22B. CPU 22A is equipped with a 32-bit RISC (Reduced Instruction Set Computer) processor. PLC MAC block 22C controls a MAC layer; and PLC PHY block 22B controls a PHY layer. AFE IC 23 includes DA converter (DAC) 23A, variable gain amplifiers (VGAs) 23B and 23C, and AD converter (ADC) 23D. Coupler 27 includes coil transformer 27A, and coupling condensers 27B and 27C.

Circuit module 20 further includes sub IC 42, AFE IC 43, band-pass filter 45, driver IC 46 and band-pass filter 49. Sub IC 42 includes PLC MAC block 42C and PLC PHY block 42B. AFE IC 43 includes DA converter (DAC) 43A, variable gain amplifiers (VGAs) 43B and 43C and AD converter (ADC) 43D.

Main IC 22, as with a general modem, is an electric circuit (LSI) that performs signal processing including basic control and modulation/demodulation for data communication. In other words, main IC 22 modulates received data, which are output from a communication terminal such as a PC, and outputs as a transmitted signal (data) to AFE IC 23. Main IC 22 also demodulates transmitted data, which are input via AFE IC 23 from power lines 2, and outputs as a received signal (data) to a communication apparatus such as a PC. Main IC 22 further outputs a predetermined communication request signal to sub IC 42 prior to the data communication, so as to check if power lines 2 can be used.

Driver IC 26 functions as a switch that blocks/passes transmitted and received signals between main IC 22 and power lines 2. In other words, driver IC 26 serves as an interface between a digital signal processing circuit and the power lines; and the data communication can be controlled by switching ON/OFF driver IC 26. Driver IC 26 can take any form of configuration, as long as it has control capabilities to allow/deny the data communication. For instance, driver IC 26 can be equipped with a switch, such as an analog switch, which enables ON/OFF control by an external signal.

A first signal output unit, a second signal output unit and a phase vector setting unit are provided as PLC PHY block 42B of sub IC 42 respectively. A data communication range setting unit is provided as PLC PHY block 22B, and band-pass filters 25 and 29. A data communication unit is provided as PLC PHY block 22B and AFE IC 23. PLC PHY block 42B is a sample of a receiver, a carrier detector, and a transmitter.

Figure 4:
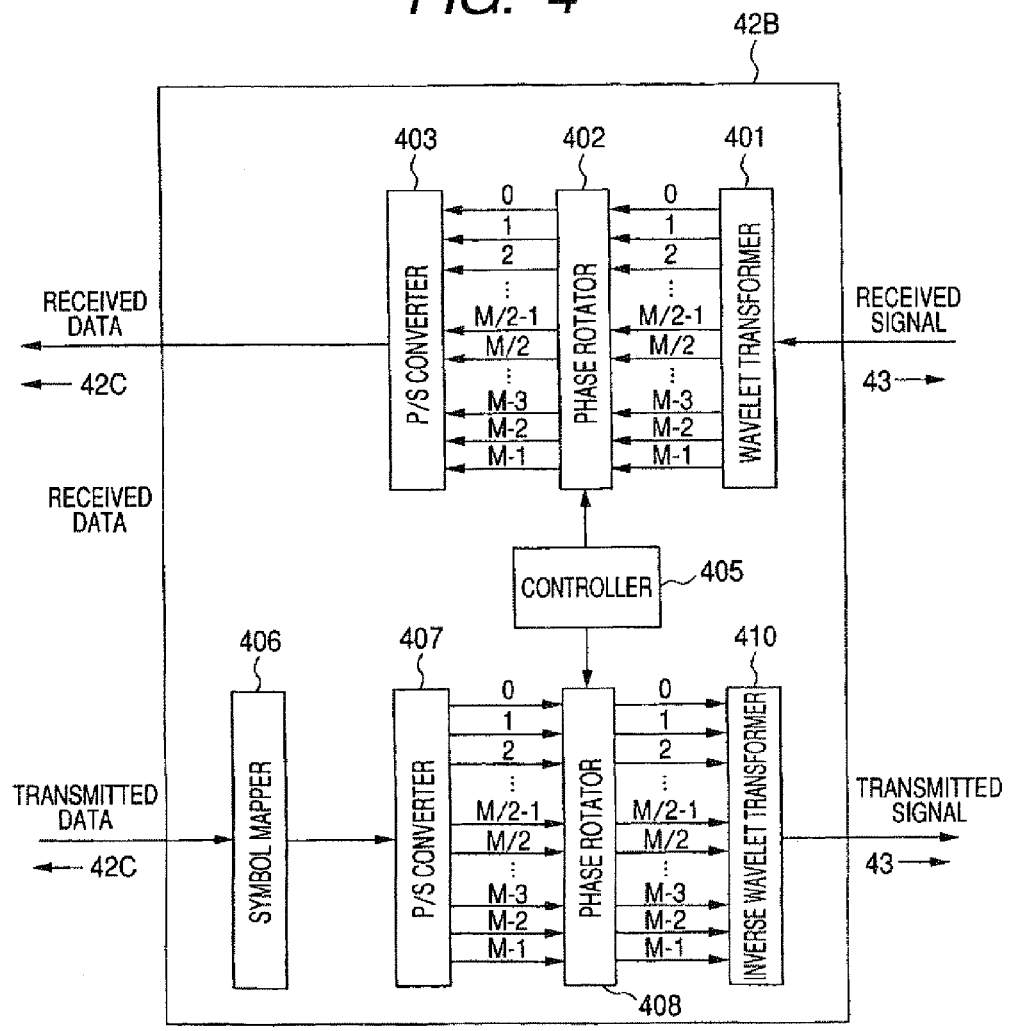
FIG. 4 is a functional block diagram of a PLC PHY block.

FIG. 4 is a functional block diagram of PLC PHY block 42B of sub IC 42. First, a phase setting process, which uses an inverse wavelet transform for a multi-carrier signal modulation, is described with reference to FIG. 4.

PLC PHY block 42B, as shown in the lower section of FIG. 4, includes: symbol mapper 406 that maps transmitted data as serial data onto a complex coordinate plane; S/P converter 407 that converts the serial data into parallel data corresponding to respective sub-carriers of a multi-carrier; phase rotator 408 that rotates each of phases of the parallel data; inverse wavelet transformer 410 that performs multi-carrier modulation by performing inverse wavelet transform on the phase-rotated parallel data; and controller 405 that controls the phase vectors rotated by phase rotator 408. Phase vector is a set of values that indicate phases corresponding to respective sub-carrier signals in a multi-carrier signal. The phase vector is the set of values for flattening time waveform levels to prevent occurrence significant peak. The signal phases of all the sub-carriers are randomly set, so that time waveform levels produce no peak. Accordingly, as the phase of each sub-carrier signal is randomized, the time waveform levels are flattened, thus producing no peak.

Symbol mapper 406 performs a first modulation in which transmitted data in the form of bit data are converted into symbol data, with a total of M−1 sub-carriers mapped onto the complex coordinate plane. S/P converter 407 converts sequentially input serial data (transmission symbols) generated through the first modulation, to be sequentially input, into parallel data corresponding to each of the sub-carriers in the multi-carrier signal. Then, phase rotator 408 rotates the phases of the input parallel data. In this case, a $(2n-1)^{th}$ input (n is a positive integer) is considered as the in-phase component of the complex data, while a $2n^{th}$ input is considered as the orthogonal component (suppose $1 \leq n \leq M/2-1$) of the complex data. The numbers of sub-carriers are considered as 0~M−1. Complex sub-carriers are made of sub-carrier pairs, and the phase of each of the sub-carriers is rotated. In this example, the maximum number of parallel data (number of sub-carriers) to be phase-rotated is M/2−1. Inverse wavelet transformer 410 performs multi-carrier modulation through the inverse wavelet transform of the phase-rotated parallel data of each sub-carrier, generating the transmitted signals in the multi-carrier. The SIP converter can be used before the symbol mapper.

Controller 405 supplies a signal that controls a phase vector (hereinafter simply referred to as a "vector control signal") to phase rotator 408, controlling settings and changes of the phase vector. in this example, controller 405 may include a random value generator. The random value generator generates a random value using, for example, a PN (Pseudo Noise) sequence and supplies the random value to phase rotator 408 as a vector control signal in order to perform phase rotation on each of its targeted sub-carriers. As such random values mentioned above, two values, i.e., 0 and π (or −1) are generated. Or, controller 405 may include a cyclic shift designator so that a vector control signal (a phase shift value) for a cyclic shift operation is generated; the vector control signal to phase rotator 405 is supplied; and phase rotation on each of the sub-carriers to be used for the communication is performed.

As described above, since phases are rotated based on the PN sequence, phase vectors having a less time correlation can be set, so that first and second signals can be differentiated with more accuracy. Particularly, using an M sequence as the PN sequence enables a setting of phase vectors having coherent auto-correlation (coherent phases), thereby achieving more accurate differentiation. Any sequence may be used to perform phase rotation as long as it has self correlation is sensitive and mutual correlation is insensitive. For example, PN sequence such as M sequence and Gold sequence may be used to perform the phase rotation.

Instead of rotating each of targeted sub-carriers each time, it is also possible to pre-save, in a medium such as a memory, output signals themselves from phase rotator 408 or inverse wavelet transformer 410, and to retrieve the signal from the memory as a given data signal each time a vector control signal is generated, so as to output the generated vector control signal as a vector control signal. Or, it is also possible to retrieve given data each time a phase vector is changed, and output the given data as a vector control signal.

The following describes a phase re-rotation process, which uses the wavelet transform for modulating the multi-carrier signal. PLC PHY block 42B, as indicated in the upper section of FIG. 4, further includes: wavelet transformer 401 that performs multi-carrier demodulation through the wavelet transform of a received signal; phase rotator 402 that rotates phases of parallel data corresponding to each of modulated sub-carriers; and P/S converter 403 that converts the parallel data corresponding to each of the phase-re-rotated sub-carriers into serial data.

Wavelet transformer 401 demodulates the multi-carrier signal through the wavelet transform of the received signal, and generates parallel data corresponding to each of the sub-carriers in the multi-carrier. Phase rotator 402 re-rotates the parallel data individually by rotating the phases of the input parallel data. Then, P/S converter 403 converts the input parallel data, each packet of which corresponds to each of the sub-carriers in the multi-carrier, into serial data so as to obtain the received data. Changing the order of phase rotator 402 and P/S converter 403 causes no operational difficulties.

Controller 405 controls settings and changes of a phase vector by supplying a vector control signal to phase rotator 402. As with the above-described phase setting process, controller 405 includes a random value generator, which generates a random value using the PN (Pseudo Noise) sequence, for instance, and supplies the generated random value as a vector control signal to phase rotator 402, in order to rotate each of the targeted sub-carriers. As such random values mentioned above, two values, i.e., 0 and π are generated. Or, controller 405 may include a cyclic shift designator so that a vector control signal (a phase shift value) for a cyclic shift operation is generated; the vector control signal to phase rotator 402 is supplied; and phase rotation on each of the sub-carriers to be used for the communication is performed. Accordingly, such a cyclic shift operation enables a large number of sub-carriers to be phase-rotated with relatively light workload.

In the first embodiment, an OFDM signal is used as a data signal or a control signal (described later). FIG. 5 shows a signal format of an OFDM signal. FIG. 6 shows a signal spectrum of the OFDM signal. The OFDM signal is configured the same way as a preamble signal, which is usually used for carrier detection and synchronization processes. The preamble signal includes a predetermined data. For instance, controller 405 inputs, as the predetermined data, a series of the same value for each sub-carrier (e.g., a signal in the form of 1,1,1, . . . for each sub-carrier) into phase rotator 408; rotates each of the sub-carriers by an appropriate phase vector; and generates a time signal through frequency-time transform at inverse wavelet transformer 410. As an actual OFDM signal, a multi-tone signal with a symbol length of approximately 100 μs (e.g., 56 waves) is used for instance.

Although descriptions have been provided above for the case where a phase vector is rotated through the wavelet transform, other transformation methods, such as a Fourier transform, can also be used. Phase setting and re-rotation processes of PLC PHY bock 22B are identical to those of PLC PHY block 42B, and their descriptions are thus omitted.

Figure 7A:
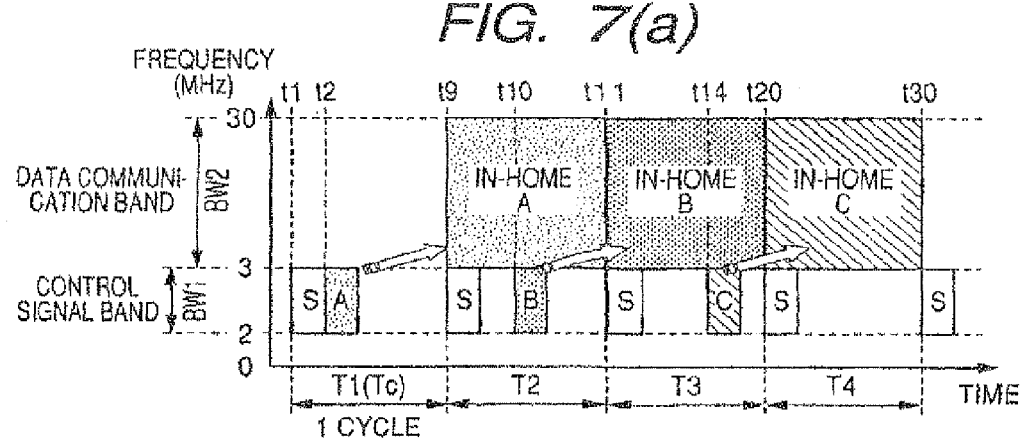
FIG. 7 (a) is a time chart that employs time division.
Figure 7B:
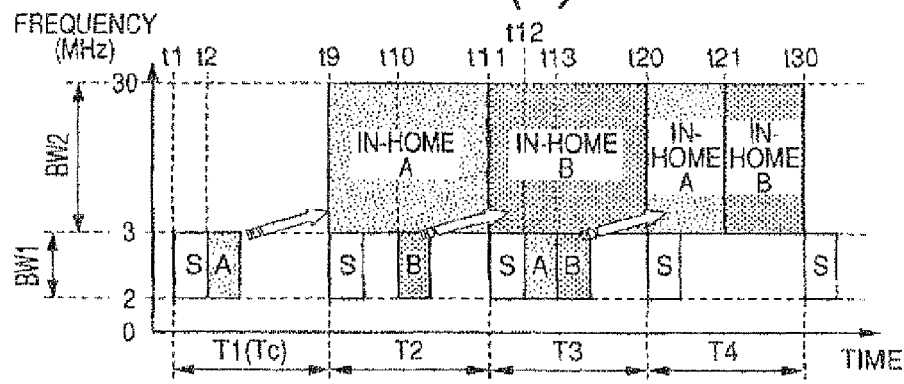
Figure 7C:
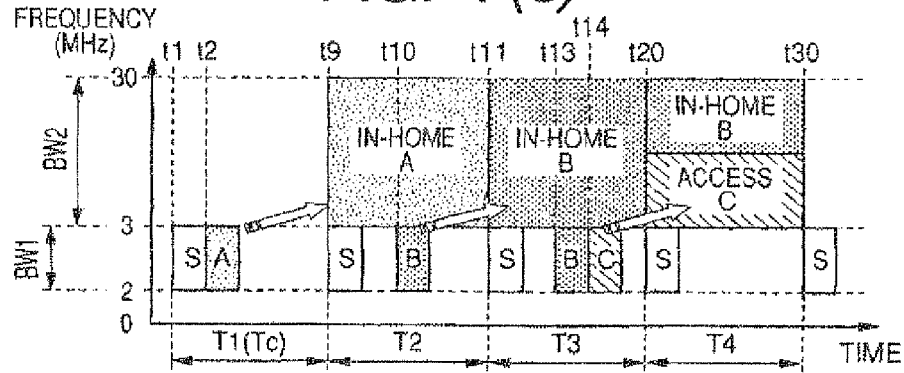

FIG. 7 (a) is a time chart that employs time division; FIG. 7 (b) is a time chart that employs another example of time division; and FIG. 7 (c) is a time chart that employs frequency and time division.

In the first embodiment, frequency bands on power lines 2 are divided, as shown in FIG. 7, into control signal band BW1 and data signal band BW2. Control signal band BW1 is a band for transmitting a control signal. The control signal is for controlling communication between modems 10, which includes a synchronization signal SS and a request signal RS, the synchronization signal SS indicating a synchronization timing for each modem 10, and the request signal RS announcing that each modem 10 starts data communication. The request signal RS is an example of the first signal; and the synchronization signal SS is an example of the second signal.

Data signal band BW2 is a band for transmitting a data signal. The data signal contains various information, such as video image, voice, and text data, which is specified in the payload of a packet. When a frequency band used for the power line communication is between 2 and 30 MHz, for instance, a frequency band of 2-3 MHz is assigned as control signal band BW1; and a frequency band of 3-30 MHz is assigned as data signal band BW2. Although an arbitrary frequency band can be selected as control signal band BW1, lower frequencies allow sampling frequencies to be lowered, thereby enabling the modem to be configured with a simple circuit.

Figure 8A:
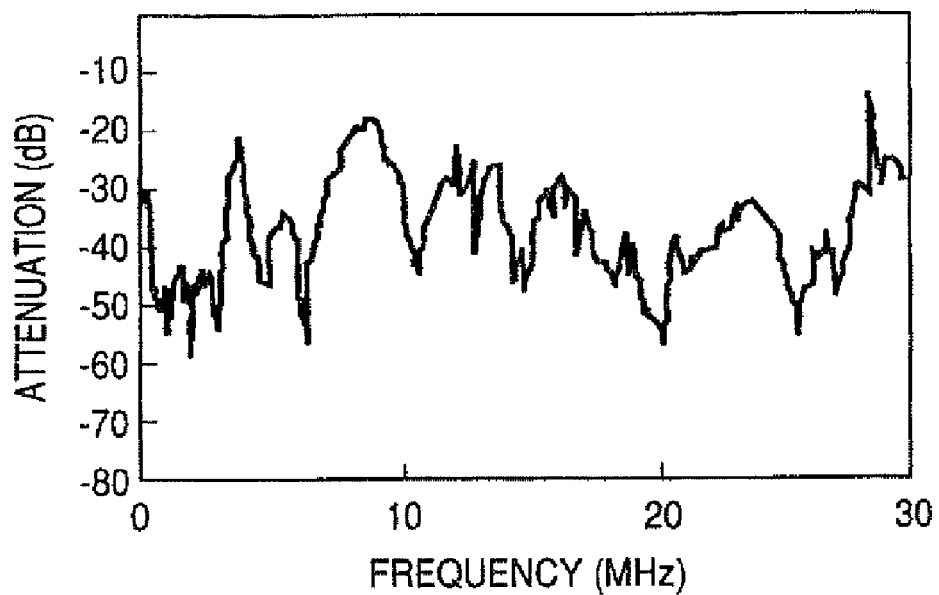
FIG. 8 (a) shows an example of attenuation-frequency characteristics on a power line.
Figure 8B:
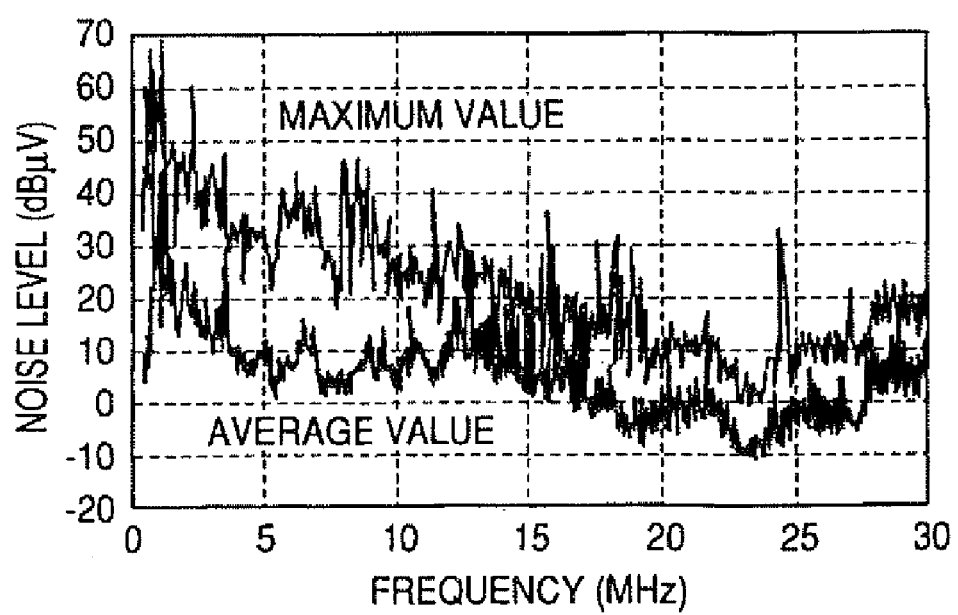

FIG. 8 (a) shows an example of attenuation-frequency characteristics on the power line; and FIG. 8 (b) shows an example of noise level-frequency characteristics on the power line. As shown in FIG. 8 (*a*), signal attenuation is high in the frequency band of 2-3 MHz, resulting in a higher noise level as shown in FIG. 8 (*b*). To achieve high-speed transmission, it is preferable that the communication uses as broad frequency band as possible. However, as described above, a noise level increases concomitantly with an attenuation level in the frequency band of 2-3 MHz, and an S/N (signal-to-noise ratio) thus decreases, thereby making only a limited contribution to high-speed transmission. Therefore, the reduction of transmission speed can be kept to a minimum by allocating the frequency band of 2-3 MHz exclusively to negotiations as control signal band BW1. This also enables the use of a relatively higher frequency band for data transmission, thereby improving its data transmission efficiency.

The following describes a specific control operation performed by PLC PHY block 42B of sub IC 42 shown in FIG. 3, the control operation allowing a plurality of modems 10 to coexist on the common power lines 2.

In the first embodiment, two or more different types of phase vectors, which use the same specifications (e.g., a sampling frequency and symbol length) of a control signal, are used as a control signal common to a plurality of types of modems 10. For instance, various types of phase vectors, such as a phase vector exclusively used for a synchronization signal SS and a phase vector exclusively used for a request signal RS, are used as needed, so as to control the a plurality of types of modems.

More specifically, PLC PHY block 42B of sub IC 42 transmits a predetermined signal to driver IC 26, so that driver IC 26 blocks data communication at main IC 22. When driver IC 26 is turned OFF, PLC PHY block 42B outputs a synchronization signal SS via AFE IC 43, band-pass filter 45 and driver IC 46. The synchronization signal SS is superimposed to AC power by coupler 27, and output to power lines 2 via power connector 12, plug 3 and outlet 5. A synchronization signal SS is set to be output during each predetermined time period; and PLC PHY block 42B repeatedly outputs a synchronization signal SS in each predetermined cycle.

As shown in FIG. 7 (*a*), PLC PHY block 42B of modem 10B1 (see FIG. 1), which uses communication method B, outputs a synchronization signal SS at times t1, t9, t11, t20, t30, . . . . As previously described, since two or more types of phase vectors are used, each modem 10 stores, in its predetermined memory (not shown), data (two values, i.e., 0 and π for each sub-carrier) related to phase vectors of a control signal, such as a synchronization signal SS and a request signal RS. Therefore, PLC PHY block 42B of each modem 10 retrieves, from its memory, data related to the phase vectors, and detects a synchronization signal SS after executing the above-described phase re-rotation process at phase rotator 402 and controller 405. By detecting a synchronization signal SS, each modem 10 sets control periods T1, T2, T3, T4, . . . , each of which defines a predetermined cycle (e.g., ms order) as one cycle. A period for transmitting a control signal, as described above, is referred to as "control period Tc".

FIG. 9 shows time slots corresponding to request signals transmitted during control period Tc. PLC PHY block 42B of each modem 10 is configured to output a request signal RS after a period corresponding to its own communication method has passed based on where a synchronization signal SS was detected. Phase rotator 408 and controller 405 execute the above-described phase setting process, so that the phase vector of the request signal RS is different from that of the synchronization signal SS.

As shown in FIG. 9, for instance, it is assumed that modem 10B1 outputs a synchronization signal SS between times t1 and t2. In this case, modems each of 10A1, 10A2 and 10A3, which uses communication method A, outputs a request signal RS after the time has passed from times t1 to t2. Modems 10B1 and 10B2, which use communication method B, output a request signal RS after the time has passed from times t1 through t3. Modems 10C1 and 10C2, which use communication method C, output a request signal RS after the time has passed from times t1 through t4. In other words, time slots T12, T13, T14, . . . , T18, which correspond to communication methods A, B, C, . . . , are set during control period Tc. A period set for each time slot does not need to be at equal intervals.

Each modem 10 stores in its predetermined memory data related to the phase vector of a request signal RS. Therefore, as with the case for a synchronization signal SS, each modem 10 retrieves, from its memory, data related to the phase vector, and detects the request signal RS after executing the phase re-rotation process at phase rotator 402 and controller 405. The request signal RS, as previously described, is set by phase rotator 408 so that its phase vector is different from that of the synchronization signal SS. Therefore, each modem 10 can differentiate the request signal RS from the synchronization signal SS based on the differences of their phase vectors.

When the same phase vector is used for a synchronization signal SS and a request signal RS, and when a carrier detection is performed using signals output from wavelet transformer 401, for instance, using correlations between carriers and a distribution of correlation values in a frequency domain, both signals become receivable, thereby making it impossible to tell whether the synchronization signal SS or the request signal RS has been transmitted. The power line communication apparatus, however, operates controller 405 to perform a carrier detection using the phase vector used for the synchronization signal SS, as well as performing a carrier detection using the phase vector used for the request signal RS. In this manner, two different phase vectors are used for two different signals, and it has thus become impossible to simultaneously perform carrier detections for a plurality of signals in a frequency domain. This enables differentiation between the synchronization signal SS and the request signal RS, which allows each modem 10 to acknowledge what a control signal signifies.

Each modem 10 stores, in its predetermined modem (not shown in the figure), data related to a correlation between a time slot and a communication method. Based on the correlation, it is possible to detect in which time slot during one control period Tc a request signal RS is output, and thus to know the number of communication methods (namely, the number of types of communication methods) of modems that have announced initiation of data transmission.

As described above, since each request signal RS is output in its corresponding time slot T12, T13, . . . , T18, interference between request signals RS can be prevented. As a result, each modem 10 can reliably detect request signals RS output from other modems 10. When a correlation between a time slot and a communication method is predetermined, the order of outputting a request signal RS is not limited to A→B→C→ . . . , but can be changed as needed. Time slots T12, T13, . . . , T18 do not need to be at equal intervals.

In addition, when a control signal is output to each of the time slots during control period Tc, any functional signification is possible for each slot. For instance, it is possible to use a specific time slot during control period Tc (e.g., time slot T18) as a special time slot for allowing a plurality of modems to coexist by employing frequency division.

Figure 10:
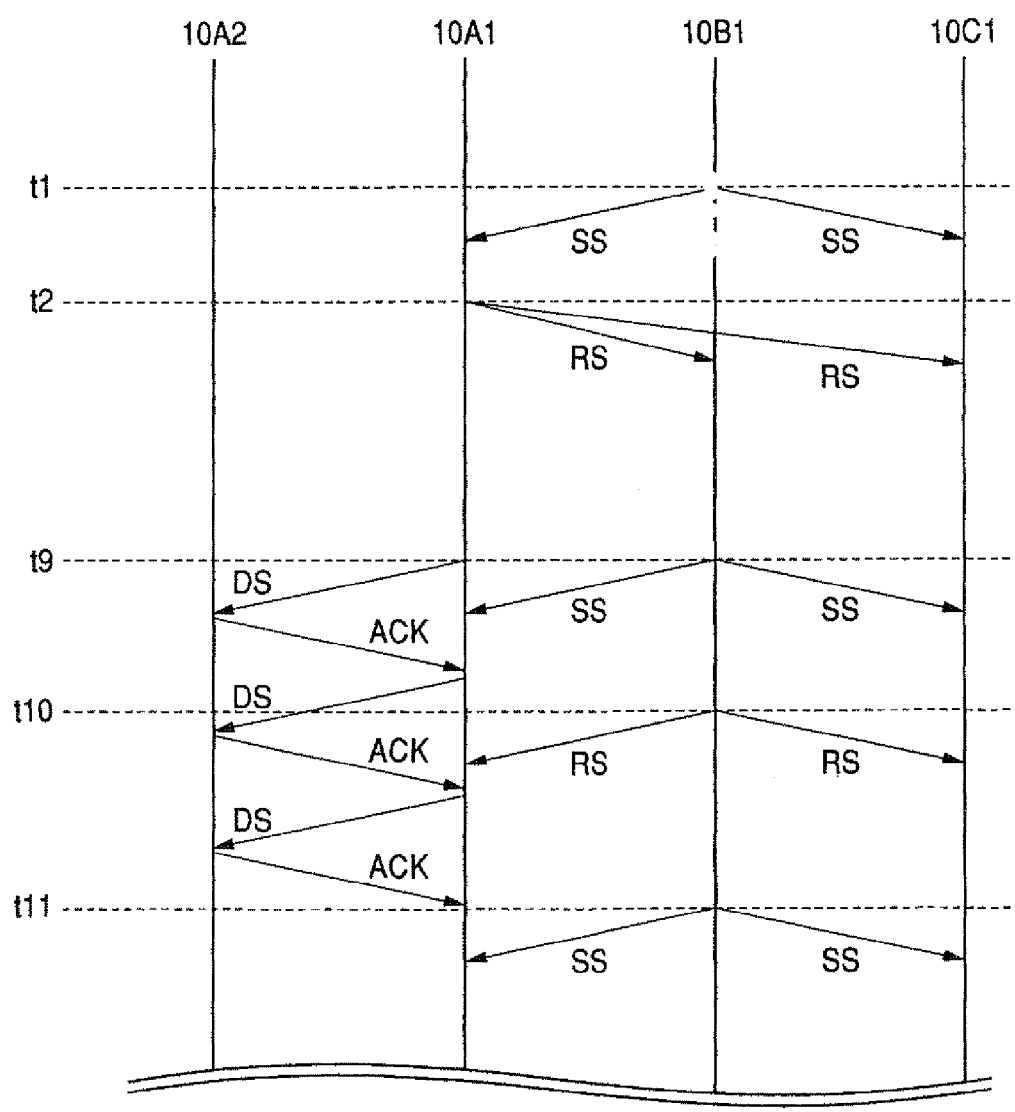
FIG. 10 is a time chart illustrating exchange of control signals between modems.

The following describes an example of a specific operation performed by modem 10 according to the first embodiment with reference to FIGS. 1, 3, 7 (a), 9 and 10. FIG. 10 shows a timing chart illustrating exchange of control signals between modems 10. In this example, modem 10B1, which uses communication method B, outputs synchronization signals. Descriptions are provided for transmission of control signals from modems 10A1, 10B1 and 10C1 only, to facilitate understanding of the embodiment.

As shown in FIGS. 7 (a), 9 and 10, modem 10B1 outputs, to power lines 2, synchronization signals SS at time t1. PLC PHY block 42B of each modem 10 monitors the status of all the time slots, i.e., T12, T13, ..., T18 during control period Tc; therefore, other modems 10A1 and 10C1 detect the synchronization signals SS output from modem 10B1. Here, it is assumed that the signal of a video image captured by intercom 109 (see FIG. 1) is transmitted to modem 10A1 via LAN cable 9. Modem 10A1 outputs, to power lines 2, request signals RS at time t2, so as to output the received signal of the video image to display telephone 103 (see FIG. 1) via modem 10A2. Other modems 10B1 and 10C1 detect the request signals RS output from modem 10A1. The request signal RS and the synchronization signal SS transmitted to modem 10A2 are not describes in FIG. 10.

Modems 10B1 and 10B2, which use communication method B, and modems 10C1, 10C2 and 10C3, which use communication method C, do not perform data communication between times t3 and t9, and therefore output no request signal RS as shown in FIGS. 7 (a) and 9. Since modem 10A1 monitors for a request signal RS in time slots T12, T13, ..., T18, and detects no request signal RS, modem 10A1 performs data communication using the following entire control period Tc (T2).

When modem 10B1 outputs to power lines 2 synchronization signals SS at time t9, main IC 22 of modem 10A1 (see FIG. 3) outputs a communication request signal to sub IC 42 (see FIG. 3). Upon receiving the communication request signal, sub IC 42 transmits a predetermined signal to driver IC 26, and allows transmitted and received signals to pass. In this state, modem 10A1, as shown in FIG. 10, transmits to modem 10A2 a data signal DS of the video signal, which has been received from intercom 109.

Upon receiving the data signal DS, modem 10A2 transmits an ACK (acknowledgement reply) to modem 10A1. Upon receiving the ACK, modem 10A1 transmits a following data signal DS. Modem 10A2 transmits the received data signal DS to telephone 103 via LAN cable 9. As a result, the video image captured by intercom 109 is displayed on the telephone 103 display. As previously described, since data communication is performed in data signal band BW2, data communication using in-home communication method A is, as shown in FIG. 7 (a), performed in the frequency band of 3-30 MHz during control period Tc (T2).

At time t9, it is assumed that the user operates TV 102 (see FIG. 1) to replay motion data, which are stored in server 105 (see FIG. 1). TV 102 then transmits a signal of requesting the motion data to modem 10B1 via LAN cable 9. Upon receiving the signal, modem 10B1, as shown in FIG. 7 (a), outputs at time t10 a request signal RS to power lines 2. During control period Tc (T2) between times t9 and t10, other modems 10 output no request signal RS. As a result, modem 10B1 detects no request signal RS from other modems 10, and therefore performs data communication using the following entire control period Tc (T3). At time t11, modem 10B1 outputs a synchronization signal SS, and then transmits a signal of requesting the motion data to server 105 via modem 10B2. Upon receiving the request signal, server 105 transmits a data signal DS of a video signal to modem 10B1, after which the motion picture stored in server 105 is displayed on TV 102. In other words, data communication using in-home communication method B is performed, as shown in FIG. 7(a), in the frequency band of 3-30 MHz during control period Tc (T3), as with the case of communication method A.

Next, it is assumed that PC 101 (see FIG. 1) transmits to an ISP (not shown) a signal of requesting, for instance, HTML (Hyper Text Markup Language) data. Upon receiving the request signal from PC 101, and detecting a synchronization signal SS output at time t11, modem 10C1 outputs a request signal RS to power lines 2 at time t14. Since other modems 10 output no request signal RS, modem 10C1 performs data communication using the entire following control period Tc (T4). After modem 10C1 transmits a request signal to modem 10C3, modem 10C3 requests a Web (World Wide Web) server (not shown) of the ISP to send the HTML data via fiber cable 8 (see FIG. 1). Upon receiving the HTML data, modem 10C3 sends the HTML data to PC 101 via modem 10C1, after which the HTML data are displayed on PC 101. In other words, data communication using access communication method C is performed, as shown in FIG. 7(a), in the frequency band of 3-30 MHz during control period Tc (T4), as with the case of communication methods A and B.

At time t20, modem 10B1 outputs a synchronization signal SS. During control period Tc (T4), however, none of modems 10 outputs a request signal RS. Therefore, no data communication is performed during control period Tc from time t30. Modem 10B1 outputs a synchronization signal SS during each control period Tc. When any modem 10 outputs a request signal RS, one of the modems 10B1 performs data communication using the following control period Tc.

As described above, in the first embodiment, different phase vectors are used for a synchronization signal SS and a request signal RS. Therefore, each modem 10 can easily detect a request signal RS output from another modem 10 based on a synchronization signal SS without performing relatively cumbersome modulation and other processes. This allows a plurality of types of modems 10 using different communication methods on the common power lines 2 to easily coexist. Particularly, for power line communication that has a great amount of co-relational noise on the time axis, each communication apparatus can perform data communication while avoiding interference between signals.

In the above-described first embodiment, descriptions have been provided for the case where the number of time slots is 8 as shown in FIG. 9. However, the number does not need to be 8, and can be arbitrary as long as it is 2 or more. Also, descriptions have been provided for the case where each time slot is pre-allocated to its corresponding communication method. However, a corresponding correlation does not need to be predetermined. When a modem is newly installed to the network, for instance, it is possible to monitor the output status of a request signal RS; and, when a vacant time slot is detected (e.g., when a time slot in which no request signal RS is output during a predetermined period is detected), the detected time slot can be used.

In the above-described first embodiment, a case has been described where data communication is performed using one communication method during one control period Tc. However, data communication can also be performed using a plurality of communication methods during one control period Tc.

Descriptions are provided, with reference to FIG. 7 (b), for the case where data communication is performed by employing timed division, using a plurality of communication methods during one control period Tc. Operations between times t1 and T11 in FIG. 7 (b) are identical to those described in FIG. 7 (a), and their descriptions are thus omitted. Modem 10A1 outputs a request signal RS at time t12; and, modem 10B1 outputs a request signal RS at time t13. Each modem 10 detects, from the request signal RS detected during one control period Tc, the number of communication methods of modems 10 that perform data communication. More specifically, modems 10A1 and 10B1 detect the request signal RS in time slot T12 corresponding to communication method A (see FIG. 9), and the request signal RS in time slot T13 corresponding to communication method B. On the other hand, modems 10A1 and 10B1 detect no request signal RS in other time slots T14, T15, ..., T18. As a result, modems 10A1 and 10B1 detect that the number of communication methods is two, i.e., communication methods A and B.

PLC PHY 22B of each modem 10 divides, based on the number of communication methods, time domains during control period Tc for data communication. in this example, the order of the divided time domains is set as communication methods A→B. Accordingly, PLC PHY 22B of modem 10A1 sets its time domain so that its data communication is performed between times t20 and t21. On the other hand, PLC PHY 22B of modem 10B1 sets its time domain so that its data communication is performed between times t21 and t30. As a result, data communication using communication method A and data communication using communication method B are performed based on time division during control period Tc (T4) as shown in FIG. 7 (b).

The following describes, with reference to FIG. 7 (c), a case where data communication is performed by employing frequency division, using a plurality of communication methods during one control period Tc. In FIG. 7 (c), operations between times t1 and t11 are identical to those described in FIG. 7 (a), and their descriptions are thus omitted. Modem 10B1 outputs a request signal RS at time t13; and modem 10C1 outputs a request signal RS at time t14. On the other hand, during control period Tc (T4), other modems 10 output no request signal RS. As a result, modems 10B1 and 10C1 detect that the number of communication methods is two, i.e., communication methods B and C.

PLC PHY 22B of each modem 10 divides, based on the number of communication methods, frequency domains during control period Tc for data communication. In this example, the in-home system is set in a high frequency band within data communication band BW2; and the access system is set in a low frequency band within data communication band BW2. As a result, PLC PHY 22B of modem 10B1 sets its frequency domain so that its data communication is performed in the high frequency band within data communication band BW2 via band-pass filters 25 and 29. PLC PHY 22B of modem 10C1, on the other hand, sets its frequency domain so that its data communication is performed in the low frequency band within data communication band BW2 via band-pass filters 25 and 29. As a result, data communication through communication method B and data communication through communication method C are performed based on frequency division during control period Tc (T4) as shown in FIG. 7 (c). As for a system such as the access system having a long transmission line, components in a high frequency band have relatively high attenuation. Therefore, the entire frequency spectrum can be more efficiently used by allocating the access system to a low frequency band.

As previously described, at least one of a time domain and a frequency domain for data communication is set based on the number of communication methods, and data communication is performed using the set domain. Therefore, each modem 10 can perform data communication while avoiding interference between data signals.

Second Embodiment

The second embodiment is described in the following with reference to FIGS. 1, 2, and 11 through 14.

Communication system 100 according to the second embodiment is identical to that described in the first embodiment, and its descriptions are thus omitted. The communication apparatus according to the second embodiment is the same modem 10 described in the first embodiment, and its description are thus omitted.

Figure 11:
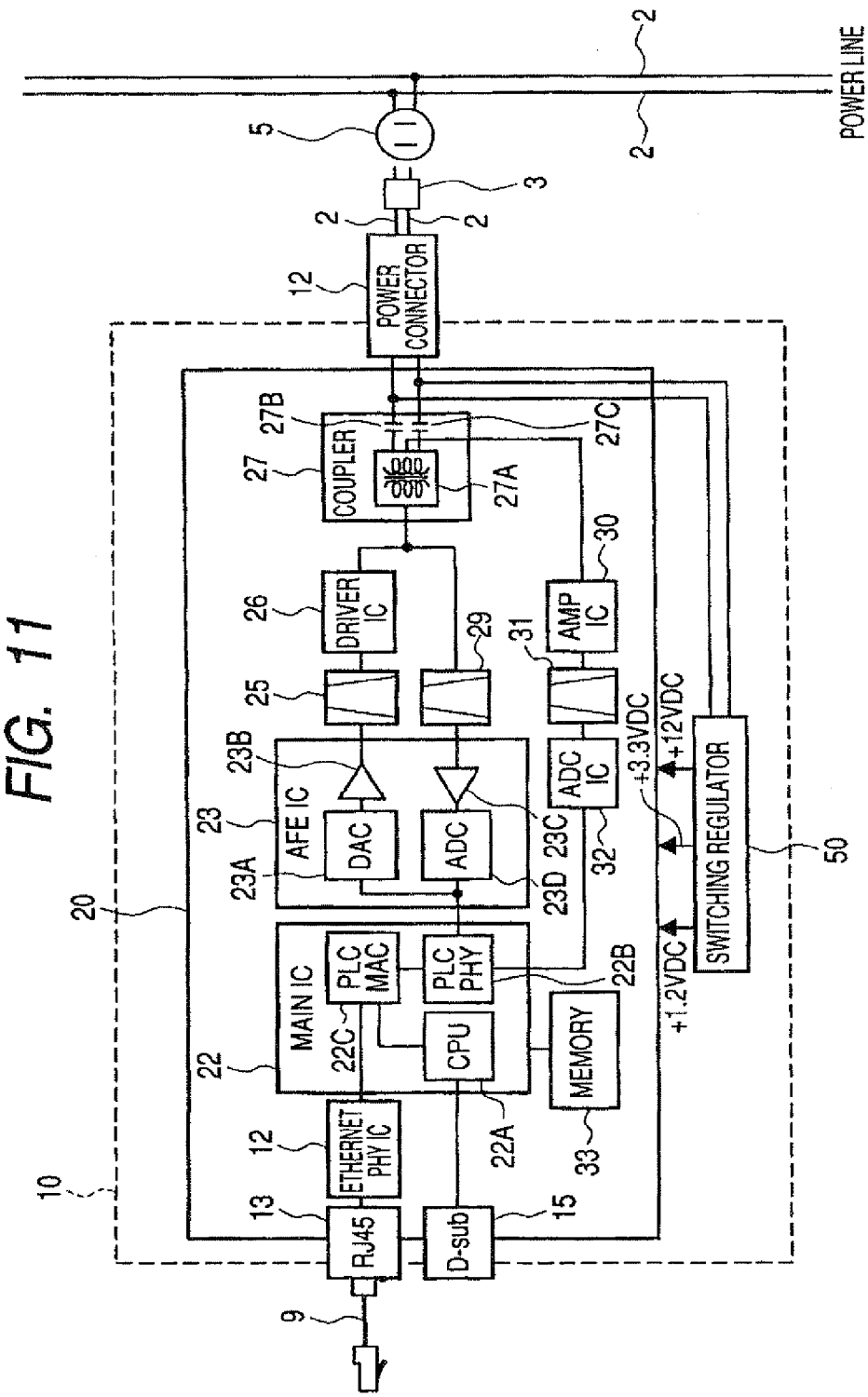
FIG. 11 is a block diagram illustrating a hardware example that constitutes a modem according to a second embodiment.

FIG. 11 is a block diagram illustrating a hardware example that constitutes modem 10 according to the second embodiment. Modem 10, as shown in FIG. 11, lacks sub IC 42, which is described in FIG. 3. Modem 10, as shown in FIG. 11, further lacks AFE IC 43, band-pass filters 45 and 49, and driver IC 46 (hereinafter these are referred to as "AFE circuit" that have been described in FIG. 3). In other words, modem 10 has the same components as described in the first embodiment except for the deleted sub IC 42 and AFE circuit, and its descriptions are thus omitted. Main IC 22 of FIG. 11 also has the function of sub IC 42 of FIG. 3. Therefore, PLC PHY block 22B of main IC 22 has the respective components described in FIG. 4, and its descriptions are thus omitted.

Figure 12A:
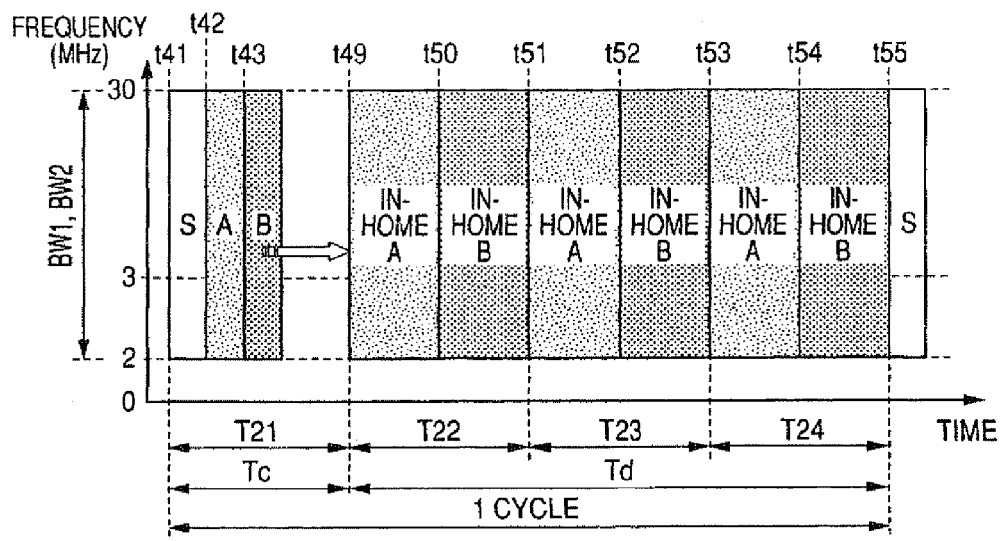
FIG. 12 (a) is a time chart that employs frequency division.
Figure 12B:
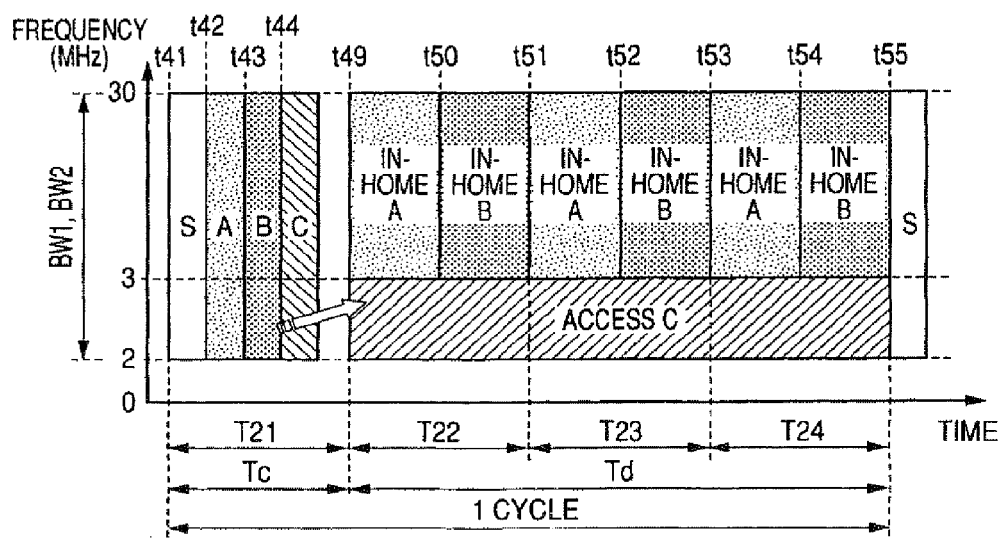

The following describes an example of a specific operation of modem 10 according to the second embodiment with reference to FIGS. 11 and 12. FIG. 12 (a) is a time chart that employs frequency division; and FIG. 12 (b) is a time chart that employs frequency and time divisions.

First, descriptions are provided for an operation example shown in FIG. 12 (a). In this example, the operation is different from that described in the first embodiment. The same frequency band is used as shared frequency band BW1, BW21, BW2 for both transmitting a control signal and performing data communication. When the frequency band for performing power line communication is set between 2 and 30 MHz, for instance, the shared frequency band BW1, BW2 is set between 2 and 30 MHz. The shared frequency band BW1, BW2 can be changed to different from the frequency band for use.

At time t41, PLC PHY block 22B of modem 10B1 outputs a synchronization signal SS to power lines 2 via band-pass filter 25, the synchronization signal SS being set in the shared frequency band BW1, BW2. At time t42, PLC PHY block 22B of modem 10A1 outputs a request signal RS using band-pass filter 25, as with the synchronization signal SS, the request signal RS being set in the shared frequency band BW1, BW2. At time t43, PLC PHY block 22B of modem 10B1, as with modem 10A1, outputs a request signal RS, which is set in the shared frequency band BW1, BW2.

In the second embodiment, as with the first embodiment, a period between two adjacent synchronization signals SS is set as one cycle. As shown in FIG. 12, however, one cycle is divided into control period Tc (T21) and its following data period Td. In other words, a control signal and a data signal are time-divided, unlike the first embodiment. Further, as shown in the example shown in FIG. 12 (a), data period Td is time-divided into a plurality of data periods T22, T23, T24, ....

More specifically, modem 10A1 performs data communication between times t49 and t50 in the shared frequency band BW1, BW2 during the first data period T22; and modem 10B1 performs data communication between times t50 and t51 in the shared frequency band BW1, BW2. Modem 10A1 performs data communication between times t51 and t52 during the second data period T23; and modem 10B1 performs data communication between times t52 and t53. Modem 10A1 performs data communication between times t53 and t54 during the third data period T24; and modem 10B1 performs data communication between times t54 and t55.

As described above, in the second embodiment, the same frequency band is used for transmitting a control signal and for performing data communication. Therefore, as described in FIG. 3 of the first embodiment, sub IC 42 and AFE circuits can be omitted. This configuration makes it possible to avoid a large-scale circuit modification so that a plurality of modems 10 can coexist on the common power lines 2.

Although time division has been described in the above-described second embodiment, frequency division can also be employed. Time division and frequency division can also be combined. A case where both time and frequency division are combined is described in the following with reference to FIG. 12 (b).

For instance, when each modem 10 detects a request signal RS from only the in-home system during control period Tc, data communication is performed using time division between different communication methods as with FIG. 12 (a). Next, as shown in FIG. 12 (b), when each modem 10 detects communication methods A, B and C, namely, request signals RS from both in-home and access systems, in-home communication methods A and B perform data communication by employing time division; and access communication method C performs data communication by employing frequency division. In this case, modems 10A1 and 10B1 using the in-home system perform data communication by narrowing the frequency band of 2-30 MHz used for transmitting control signals to, for instance, the frequency band of 3-30 MHz so that data communication can be achieved in that narrowed frequency band. On the other hand, modem 10C1 using the access system performs data communication in the vacant frequency band of 2-3 MHz. In this case, since different frequency bands are used for transmitting control signals and data signals DS, each modem 10 may have the hardware configuration described in FIG. 3.

In addition, FIG. 12 (b) is a mere example of a combination of time division and frequency division, and a different combination can also be used. For instance, when there are a plurality of communication methods using the access system, data communication can be performed by using time division among the communication methods using the access system. It is also possible to use time division as a multiple-access method for the in-home and access systems, while using frequency division within each of the in-home and access systems. Further, it is possible to determine whether to use time division or frequency division as its communication method on the basis of which time slot is to be used.

Figure 13:
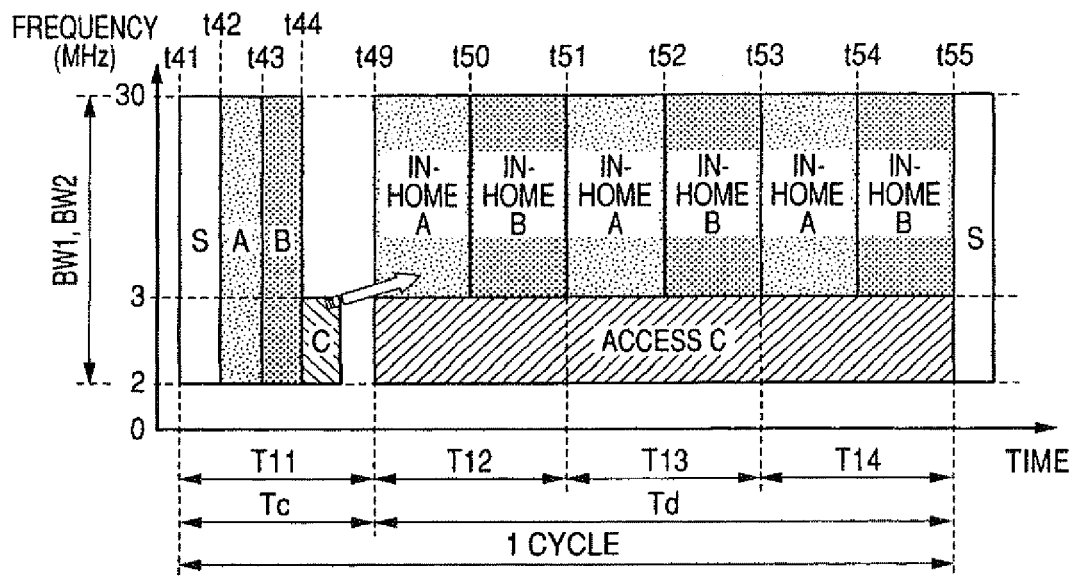
FIG. 13 is a time chart illustrating an operation example of a plurality of modems, when different request signals are transmitted.

Further, in the above-described second embodiment, descriptions have been provided for the case where control signals are all transmitted in the same frequency band. However, it is also possible to use different frequency bands for transmitting different control signals. FIG. 13 is a time chart illustrating an operation example of a plurality of modems 10, when different request signals are transmitted. In this case, a control signal using the in-home system uses the frequency band of 2-30 MHz; and a control signal using the access system uses the frequency band of 2-3 MHz. In-home data communication uses the frequency band of 3-30 MHz, which is different from the band used for transmitting control signals. Access data communication, on the other hand, uses the frequency band of 2-3 MHz, which is the same as the band used for transmitting control signals. This way (for the purpose of reducing the circuit size, for instance), a communication method using a narrow frequency band only can prevent the circuit size from being large.

Figure 14:
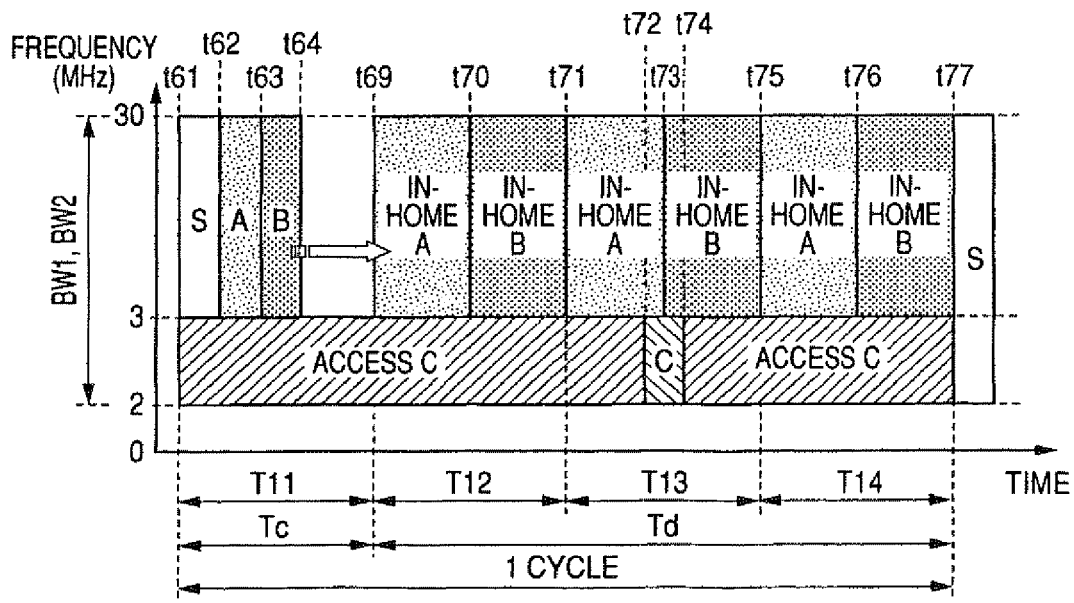
FIG. 14 is a time chart illustrating an operation example of the plurality of modems, when some communication methods are not in sync with synchronization signals.

In the first and second embodiments described above, a case has been described where all the communication methods are in sync with synchronization signals SS. However, it is also possible not to synchronize some communication methods. FIG. 14 is a time chart illustrating an operation example of a plurality of modems 10, when some communication methods are not in sync with synchronization signals.

In the FIG. 14 example, it is necessary to transmit/receive a request signal RS not in sync with a synchronization signal SS. Other communication methods need to detect a carrier of a request signal RS of communication method C, the request signal RS being transmitted/received asynchronous with a synchronization signal SS. When the carrier is detected, it is necessary to narrow the frequency band used for the synchronization signal SS and the request signal RS so that both signals do not interfere with communication method C. A communication method in sync with the synchronization signal SS can recognize which communication method uses power lines 2 in what form in each time slot.

It is possible to recognize communication methods asynchronous with each other by receiving asynchronous request signals. However, considering the condition of the transmission line as described in FIG. 8 (b), there may be a case where it is impossible to tell whether a request signal RS, which is in a broad band for a communication method (which can be in a receiving mode), appears to be concentrated in a lower frequency band, affected by the characteristics of the transmission line, or the request signal RS is originally set in the lower frequency band only. To prevent this, the phase vector of a request signal RS for synchronous coexistence and the phase vector of a request signal RS for asynchronous coexistence are set differently, so that it becomes possible to recognize whether it is the request signal RS in a broad band or the request signal RS in an originally narrow band. It is still impossible to recognize, through an asynchronous communication method, a communication method in sync with a synchronization signal SS. However, asynchronous communication methods can coexist by employing a coexistent method using frequency division even when a synchronous communication method can not be recognized.

Affected by the transmission lines as power lines 2, even when the request signal RS in the broad band and the request signal RS in the narrow band cannot be differentiated, it has been described that both signals can be differentiated by using different phase vectors. However, it is possible to differentiate both signals by determining whether or not request signals RS are detected synchronously with respect to synchronous and asynchronous types.

In the above-described first and second embodiments, a synchronization signal SS can be generated in any form, as long as it is repeatedly output during a predetermined period. For instance, commercial alternating current voltage AC (or current) on power lines 2 can be used to generate a synchronization signal SS. In this case, for instance, a zero cross of the commercial alternating current voltage AC is detected, and a synchronization signal SS (e.g., a pulse waveform made of rectangular waves) is generated using a point where the zero cross is detected as a reference time. When the commercial alternating current voltage AC is 100V, 60 Hz, for instance, a synchronization signal SS is generated with 60 Hz as a reference frequency. In this case, a zero cross circuit, which includes a comparator or the like, and is connected (directly or indirectly) to power lines 2, can be installed in modem 10 shown in FIG. 3 or 11. Average of plurality of reference times representing the zero cross may be used for the reference time. The stable reference time can be set even if the zero cross fluctuates.

In the above-described first and second embodiments, descriptions have been provided for the case where modem 10B1, which uses communication method B, outputs a synchronization signal SS. However, it is also possible that modems 10, which use other communication methods A and C, output a synchronization signal SS as long as at least one modem 10 outputs a synchronization signal SS. Modem 10, which outputs the synchronization signal SS, can be set in either a fixed or variable mode; further, when the variable mode is selected, its setting can be made either manually or automatically.

For fixed setting, for instance, modem 10 using a specific communication method can be set as a default to output a synchronization signal SS. For manual variable setting, the user can provide in model 10 an interface (e.g., a switch) that can control whether or not to output a synchronization signal SS. For automatic variable setting, on the other hand, modem 10 searches for (listens to) a synchronization signal SS (or a request signal) during at least one control period Tc. When a synchronization signal SS is detected, modem 10 itself does not output a synchronization signal SS. On the other hand, when a synchronization signal SS is not detected, modem 10 outputs a synchronization signal SS. This way, priority is given to a synchronization signal SS transmitted from modem 10 that has already performed power line communication on power lines 2. Accordingly, even when the modem 10 is disconnected from power lines 2, one of the other modems 10 automatically outputs a synchronization signal SS.

In the above-described first and second embodiments, descriptions have been provided for the case where the phase vectors of a synchronization signal SS and a request signal RS are different, but the phase vectors of request signals RS are all identical. However, it is also possible to set different phase vectors for request signals RS depending on each of different communication methods. For instance, when sending a signal of transmission completion (a completion signal), a new different phase vector can be used for the completion signal. This can build a more flexible environment where modems 10 can coexist. In other words, each modem 10 can identify each other even when request signals RS are randomly output (namely, regardless of time slots). This reduces time required for outputting a request signal RS (namely, control period Tc), and improves communication efficiency of the request signal RS.

Third Embodiment

The third embodiment is described in the following with reference to FIGS. 15 through 17.

Communication system 100 according to the third embodiment is identical to that described in the first embodiment, and its descriptions are thus omitted. As shown in FIG. 2, the communication apparatus according to the third embodiment is identical to modem 10 according to the first embodiment, and its descriptions are thus omitted.

Figure 15:
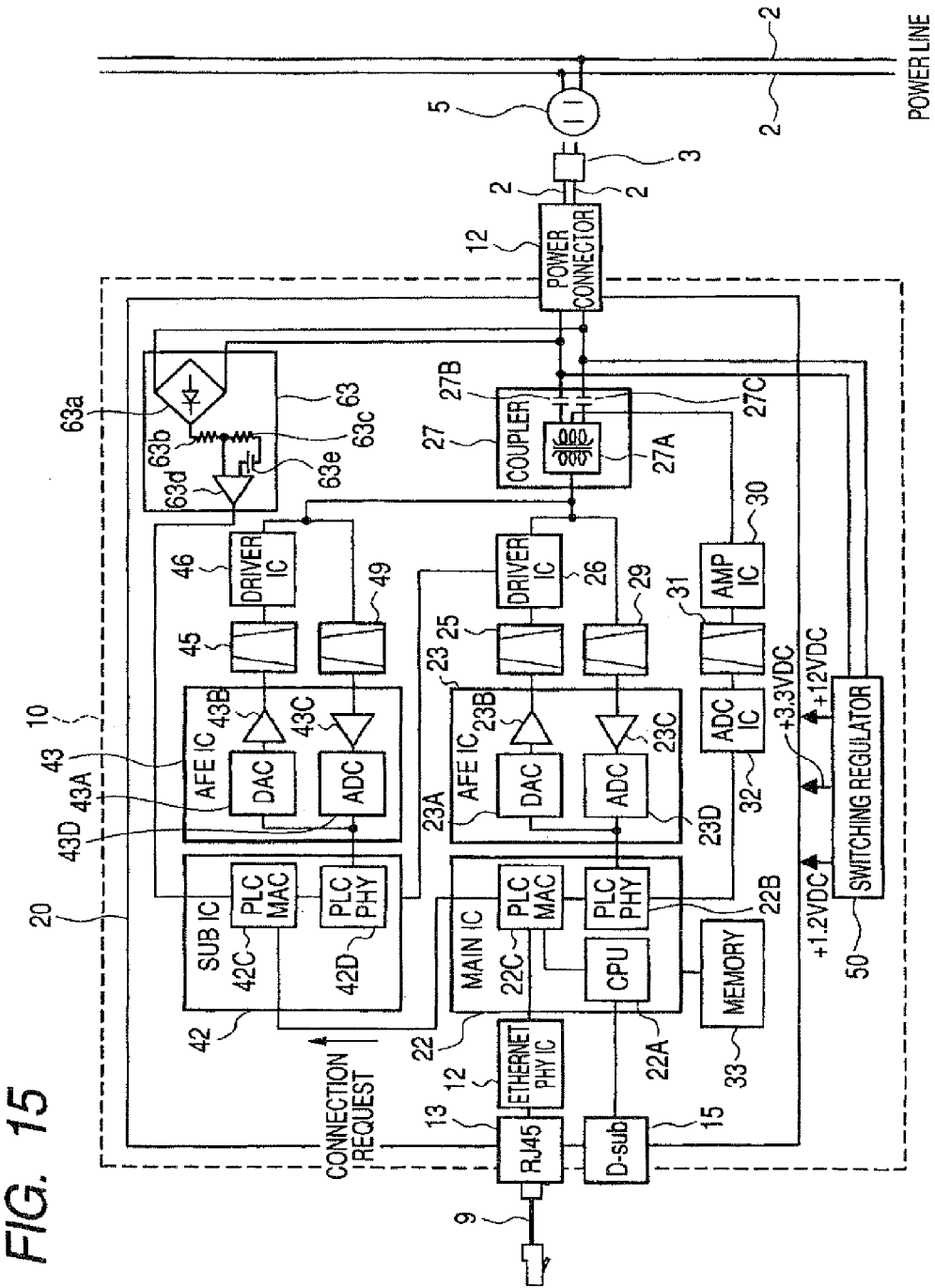
FIG. 15 is a block diagram illustrating a hardware example that constitutes a modem according to a third embodiment.

FIG. 15 is a block diagram illustrating a hardware example that constitutes modem 10 according to the third embodiment. In the circuit configuration shown in FIG. 15, zero cross circuit 63 is provided in modem 10 described in FIG. 3. The circuit configuration shown in FIG. 15 is identical to that described in FIG. 3 except for zero cross circuit 63, and PLC PHY block 42D (described later) of sub IC 42. Therefore, the same components are assigned the same numbers, and their descriptions are thus omitted.

Zero cross circuit 63 includes bridge connection diode 63a, resistors 63b and 63c, DC power 63e and comparator 63d. Bridge connection diode 63a is connected to resistor 63b; and the connected resistor 63b is connected in series to another resistor 63c. These two resistors 63b and 63c are connected parallel to an input terminal on one end, which is provided in comparator 63d. A plus side of DC power 63e is connected to an input terminal on the other end, which is provided in comparator 63d. PLC MAC block 42C of sub IC 42 is connected to an output terminal, which is provided in comparator 63d.

Figure 16:
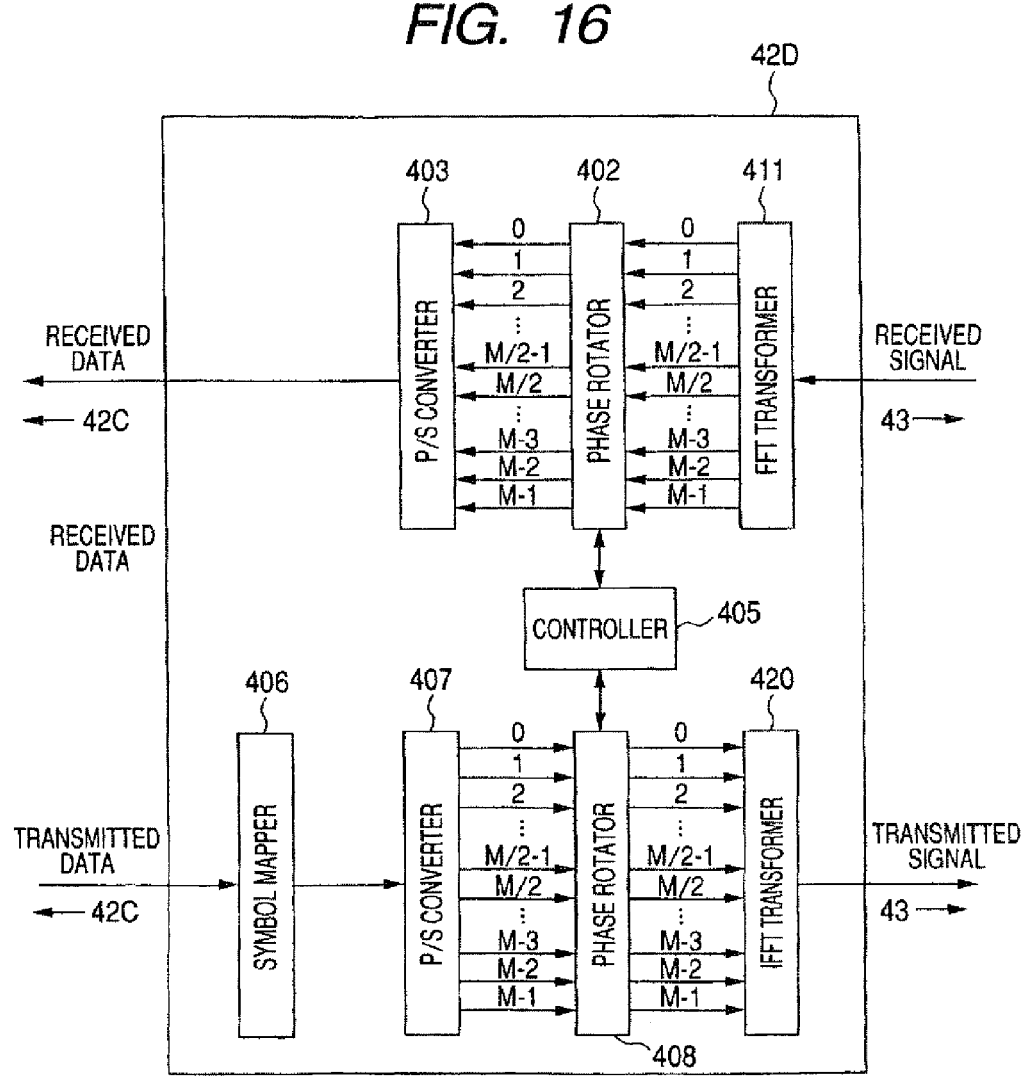
FIG. 16 is a functional block diagram of a PLC PHY block of a sub IC.

FIG. 16 is a functional block diagram of PLC PHY block 42D of sub IC 42. PLC PHY block 42D performs FFT (Fast Fourier Transform) as time-frequency transform. In other words, PLC PHY block 42D includes FFT transformer 411 and IFFT (Inverse Fourier Transform) transformer 420 instead of wavelet transformer 401 and inverse wavelet transformer 410 as described in FIG. 4. In the functional block described in FIG. 16, the components common to those of FIG. 4 are assigned the same numbers, and their descriptions are thus omitted. Time-frequency transform does not need to be FFT transform, but can also be wavelet transform described in the first and second embodiments.

Figure 17:
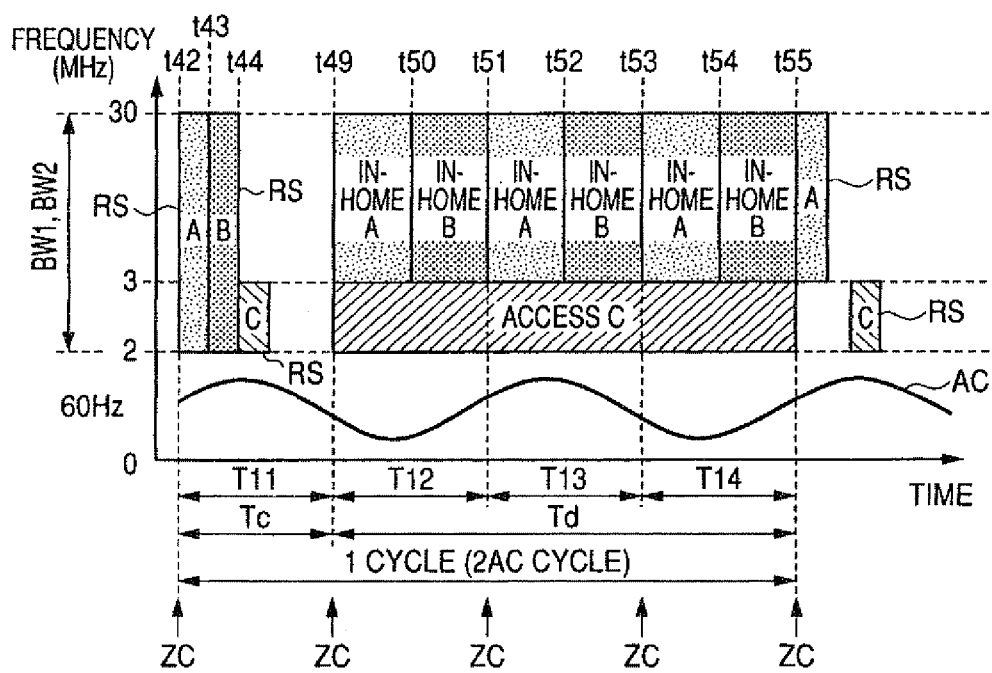
FIG. 17 is a time chart illustrating an operation example of a plurality of modems according to the third embodiment.

The following describes an example of a specific operation of modem 10 according to the third embodiment with reference to FIGS. 15 through 17. FIG. 17 is a time chart illustrating an operation example of a plurality of modems 10 according to the third embodiment. The operation shown in FIG. 17 is different from that shown in FIG. 14 only in that synchronization is executed in accordance with commercial alternating current voltage AC, and request signals RS have different phase vectors. In FIG. 17, the operations common to those shown in FIG. 14 are assigned the same numbers, and their descriptions are thus omitted. Commercial alternating current voltage AC shown in FIG. 17 indicates "voltage" on the vertical scale, for the sake of easy understanding. The following describes a case where commercial alternating current voltage AC is indicated in the time chart, as shown in FIG. 17. Further, in FIG. 17, 60 Hz is indicated as commercial alternating current voltage AC, but other voltage values, for instance, 50 Hz, can also be used.

In this example, each modem 10A1, 10A2, 10B1, 10B2, . . . has its predetermined phase vector set differently, depending on a frequency band used for a request signal RS. Communication methods A and B use the entire frequency band of 2-30 MHz (of 2-30 MHz). Communication method C uses the frequency band of 2-16 MHz (of 2-30 MHz). Arbitrary frequency band can be used for transmitting a request signal RS.

Each modem 10 is designed to transmit a request signal RS and perform data communication using as a reference point: a zero cross point (voltage is 0 VAC) of commercial alternating current voltage AC in zero cross circuit 63. In this case, 2 AC cycle is considered as one cycle from the zero cross of the commercial alternating current voltage AC; and time slots for outputting a request signal RS are set, starting at the zero cross, in the order of communication methods A, B and C.

At time t42, zero cross circuit 63 of modem 10A1 detects the zero cross ZC of the commercial alternating current voltage AC. When the zero cross ZC is detected, controller 405 of PLC PHY block 42D of modem 10A1 retrieves data related to a phase vector from memory 33. The data related to the phase vector indicates phase vector PV1. More specifically, PV1 includes rotation degree coefficients which are made of two values, i.e., 0 and π, corresponding to each sub-carrier, or phase shift values to cyclically shift the sub-carriers with these coefficients. Phase rotator 408 of PLC PHY block 42D rotates the phase vector of each of the sub-carriers constituting a multi-carrier signal, by phase vector PV1. IFFT transformer 420 of PLC PHY block 42D performs IFFT transform on the phase-rotated multi-carrier signal in order to generate a request signal RS. IFFT transformer 420 outputs the generated request signal RS to power lines 2 via AFE IC 43, band-pass filter 45, driver IC 46, coupler 27, power connector 12 and plug 3.

As with modem 10A1, modem 10B1 detects zero cross ZC in zero cross circuit 63 at time t42. When zero cross ZC is detected, controller 405 of PLC PHY block 42D of modem 10B1 retrieves data related to a phase vector from memory 33. Since communication methods A and B use the same frequency band for transmitting a request signal RS, the data related to the retrieved phase vector indicates phase vector PV1 as with modem 10A1. Phase rotator 408 of PLC PHY block 42D rotates, based on the retrieved phase-vector-related information, the phase vector of each sub-carrier constituting a multi-carrier signal, by phase vector PV1 as with modem 10A1. IFFT transformer 420 of PLC PHY block 42D performs IFFT transform on the phase-rotated multi-carrier signal in order to generate a request signal RS. At time t43, IFFT transformer 420 outputs the generated request signal RS to power lines 2, using the detected zero cross as a reference point, in the time slot set for communication method B.

As with modem 10A1, modem 10C1 detects a zero cross ZC in zero cross circuit 63 at time t42. Upon detecting the zero cross ZC, controller 405 of PLC PHY block 42D of modem 10C1 retrieves, from memory 33, data related to a phase vector indicating phase vector PV2, which is different from phase vector PV1, since communication method C uses a frequency band different from communication methods A and B for transmitting a request signal RS. Phase rotator 408 of PLC PHY block 42D rotates the phase of each sub-carrier constituting a multi-carrier signal, by phase vector PV2, based on the data related to the retrieved phase vector, unlike modems 10A1 and 10B1. IFFT transformer 420 of PLC PHY block 42D performs IFFT transform on the phase-rotated multi-carrier signal in order to generate a request signal RS. At time t44, IFFT transformer 420 outputs the generated request signal RS to power lines 2, using the detected zero cross as a reference point, in the time slot set for communication method C.

Figure 18:
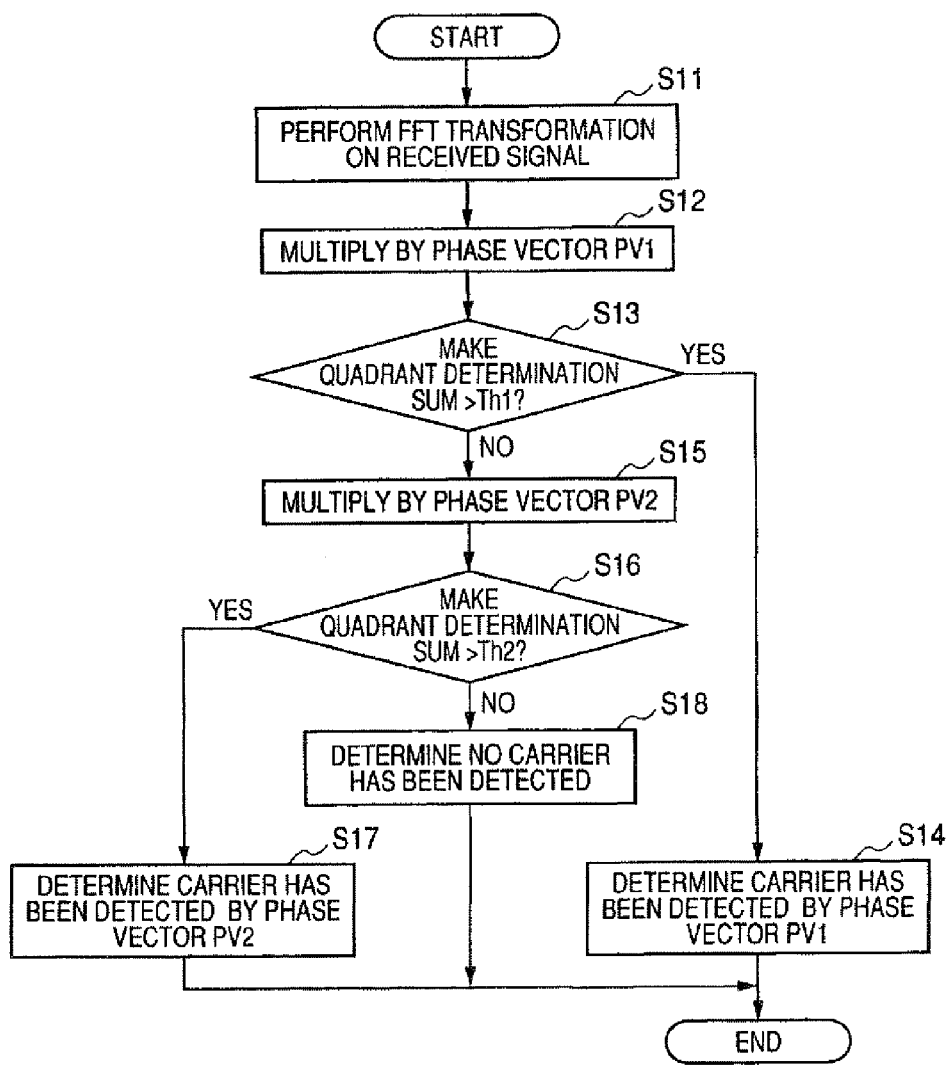
FIG. 18 is a flowchart illustrating a process of detecting a request signal.

The following describes a process of detecting a request signal RS performed by modem 10 with reference to FIGS. 16 to 18. FIG. 18 is a flowchart illustrating a process of detecting a request signal RS. FFT transformer 411 of PLC PHY block 42D of modem 10 performs FFT transform on a received signal (step S11). Controller 405 of PLC PHY block 42D retrieves, from memory 33, data related to phase vector PV1. Phase rotator 402 of PLC PHY block 42D rotates the phase of each sub-carrier by referring to the data related to phase vector PV1 and multiplying the FFT-transformed received signal by phase vector PV1 (step S12).

Controller 405 of PLC PHY block 42D makes a quadrant determination on the phase rotated sub-carriers (step S13) as specifically described in the following. In this example, it is assumed that 512 sub-carriers are used, and phase vectors on the transmitting and receiving sides are a plurality of coefficients, which indicate rotation degrees (e.g., $\pi, 0, \pi, \pi, \ldots, 0$) corresponding to sub-carrier numbers 1,2,3,4, . . . , 512.

A request signal RS includes known transmitted data as known data, such as a preamble. The transmitted data correspond to sub-carrier numbers 1,2,3,4, . . . , 512. Although known transmitted data can be arbitrary, all of the data are set as "1" in this example. "1" represents (1, 0) on the complex coordinate plane. Accordingly, the known data are in the form of 1,1,1,1, . . . , 1, which correspond to sub-carrier numbers 1,2,3,4, . . . , 512. Phase rotator 408 on the transmitting side multiplies the known data 1,1,1,1, . . . , 1 by the phase vectors ($\pi, 0, \pi, \pi, \ldots, 0$), and outputs request signals RS having −1,1,−1,−1, . . . 1 as transmitted data to power lines 2.

Phase rotator 402 on the receiving side respectively multiplies transmitted data −1,1,−1,−1, . . . , 1 by coefficients ($\pi, 0, \pi, \pi, \ldots, 0$), each of the transmitted data being included in each sub-carrier of the transmitted request signal RS. As a result, known data in the form of transmitted data 1,1,1, 1, . . . , 1, are re-rotated. Controller 405 determines whether the transmitted data indicated by the phase-rotated sub-carriers are known data such as a preamble. In this case, controller 405 sums up the transmitted data, and compares with predetermined threshold Th1. For instance, when threshold Th1 is "258" and the transmitted data are presumably correct, integration value SUM is "512 (=1+1+1+1+ . . . +1)". Therefore, controller 405 determines that integration value SUM has exceeded threshold Th1 (step S13: YES). Upon determining that integration value SUM has exceeded threshold Th1, controller 405 determines that a carrier with phase vector PV1 has been detected (step S14), and terminates the process. In other words, the received signal is a multi-carrier signal whose phase vector is PV1. On the other hand, when integration value SUM has not exceeded threshold Th1, controller 405 determines that integration value SUM has not exceeded threshold Th1 (step S13: NO).

Upon determining that integration value SUM has not exceeded threshold Th1, controller 405 retrieves, from memory 33, data related to phase vector PV2. Phase rotator 402 of PLC PHY block 42D multiplies the FFT-transformed received signal by phase vector PV2 and rotates the phase of each sub-carrier (step S15). Controller 405 of PLC PHY block 42D makes a guardant determination on the phase-rotated sub-carriers (step S16) as with step 13. Upon determining that integration value SUM has exceeded threshold Th2 (step S16: Yes), controller 405 determines that a carrier with phase vector PV2 has been detected (step S18), thereby terminating the process. In other words, the received signal is a multi-carrier signal whose phase vector is PV2. The guardant determination is described in detail later.

On the other hand, upon determining that integration value SUM has not exceeded threshold Th2 (step S16: No), controller 405 determines that the received signal has neither phase vector PV1 nor PV2 (that it, the signal is a multi-carrier signal whose phase vector is other than PV1 and PV2, or is noise) (step S17), and determines that no carrier with phase vectors PV1 and PV2 has been detected (step S18), thereby terminating the process. It is also possible to perform steps 15 and 16 before steps 12 and 13 in FIG. 18. The phase vector does not need to be two types, i.e., PV1 and PV2, but can be three types or more.

Here, it is assumed, for instance, that the transmission status of the power line has been deteriorated and a gain in the frequency band of 16-30 MHz has become lower. In this case, request signals RS output from modems 10A1 and 10B1 suffer a higher S/N ratio of sub-carriers, which are transmitted in the frequency band at or higher than 16 MHz. This makes it difficult to differentiate request signals RS output from modems 10A1 and 10B1 from request signals RS output from modem 10C1. However, since different phase vectors are set for modems 10A1, 10B1 and 10C1, request signals RS can be smoothly differentiated from each other when each modem 10 performs the above-described process of detecting a request signal RS.

As described above, in the third embodiment, different phase vectors are used in accordance with frequency bands used for a request signal RS. As a result, it becomes possible to differentiate request signals RS even when the transmission status of the power line is deteriorated.

Fourth Embodiment

Communication system 100 according to the fourth embodiment is identical to that described in the first embodiment, and its descriptions are thus omitted. The communication apparatus according to the fourth embodiment is identical to modem 10 according to the first embodiment as shown in FIG. 2, and its descriptions are thus omitted. The circuit configuration of modem 10 according to the fourth embodiment is identical to that of FIGS. 15 and 16, and its descriptions are thus omitted.

Figure 19:
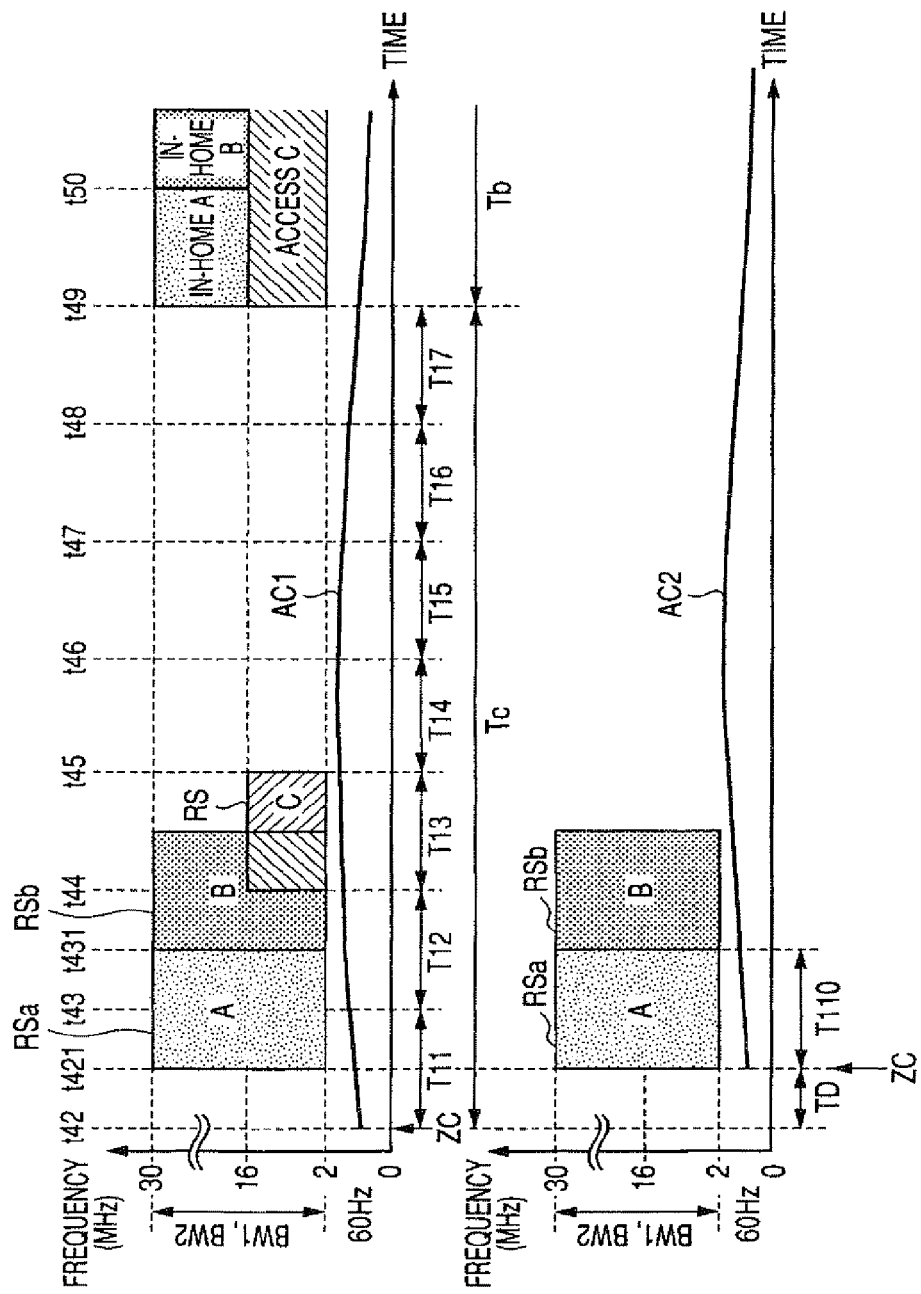
FIG. 19 shows time slots corresponding to request signals according to a fourth embodiment.
Figure 20:
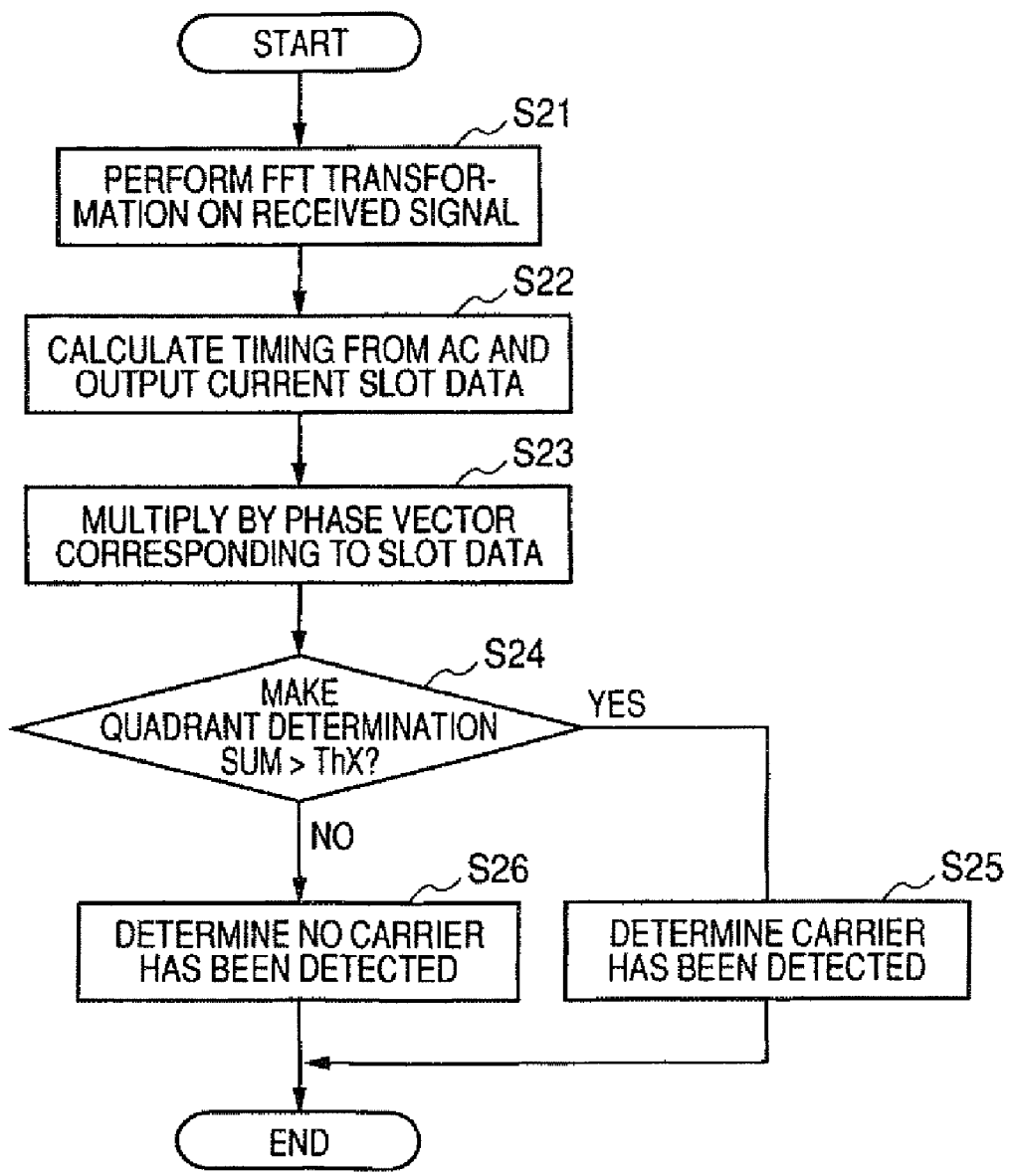
FIG. 20 is a flowchart illustrating a process of detecting a request signal according to the fourth embodiment.

The following describes an example of a specific operation of modem 10 according to the fourth embodiment with reference to FIGS. 19 and 20. FIG. 19 shows time slots corresponding to request signals according to the fourth embodiment; and FIG. 20 is a flowchart illustrating a process of detecting a request signal according to the fourth embodiment. FIG. 19 has extended control period Tc shown in FIG. 17. In the fourth embodiment, which differs from the third embodiment, different phase vectors are set for respective time slots T11, T12, . . . , T17. It is also possible that different phase vectors are used for different frequency bands for use and for different time slots. The number of time slots is arbitrary as long as it is two or more.

Detailed descriptions are provided in the following. It is assumed that various electric appliances (not shown) are respectively connected to outlets 5, to which modems 10A1 and 10B1 are connected. In this case, affected by the electric appliances (e.g., impedance variation), commercial alternating current voltage AC2 at outlets 5, to which modems 10A1 and 10B1 are connected, incurs a time-lag from commercial alternating current voltage AC1 at outlets 5, to which other modems 10C1, . . . are connected. FIG. 19 (a) shows a waveform of commercial alternating current voltage AC1 at the outlets, to which other modems 10C1 . . . are connected, while FIG. 19 (b) shows a waveform of commercial alternating current voltage AC2 at the outlets, to which modems 10A1 and 10B1 are connected. Commercial alternating current voltage AC2, as shown in FIGS. 19 (a) and (b), is delayed by time TD compared to commercial alternating current voltage AC1.

In this case, when modem 10A1 outputs a request signal RSa, zero cross circuit 63 detects a zero cross ZC of commercial alternating current voltage AC2. Commercial alternating current voltage AC2 is delayed only by time TD compared to commercial alternating current voltage AC1. Therefore, modem 10A1 outputs a request signal RSa at time t421, which is delayed only by time TD from time t42.

When modem 10B1 outputs a request signal RSb, zero cross circuit 63 detects at time t421 a zero cross ZC of commercial alternating current voltage AC2 as with modem 10A1. Upon detecting zero cross ZC, modem 10B1 outputs a request signal RSb at time t431, which is delayed only by time TD from time T43, At this stage, modem 10C1 has performed a process of detecting a request signal RS as shown in FIG. 20, and detects the request signals RSa and RSb. The following describes a carrier detection process in time slot T12 with reference to FIG. 20.

FFT transformer 411 of PLC PHY block 42D of modem 10C1 performs FFT transform on a received signal (step S21). Next, PLC PHY block 42D retrieves, from memory 33, data related to a phase vector as slot data corresponding to time slot T12. Memory 33 stores data related to different phase vectors corresponding to time slots T11,T12,T13, . . . . In this example, phase vector PV1 is set for communication method A; and phase vector PV2 is set for communication method B. Memory 33 stores the data related to phase vectors PV1 and PV2 corresponding to time slots T11 and T12, respectively.

PLC PHY block 42D outputs the current slot data in zero cross circuit 63 (step S22). More specifically, modem 10C1 recognizes, from commercial alternating current voltage AC1 in zero cross circuit 63, that a zero cross ZC is at time t42. Each modem 10 includes a counter (not shown) and stores data indicating the time durations of the time slots. Therefore, each modem 10 can specify how many time slots exist between the current time slot and the zero cross ZC by both the elapsed time from zero cross ZC and time width of the time slot.

At time t43, for instance, PLC PHY block 42D of modem 10C1 recognizes that an elapsed time from the zero cross ZC is a time duration per time slot, and determines that the current time slot is "T12". As a result, controller 405 of PLC PHY block 42D retrieves, from memory 33, the data related to phase vector PV2 corresponding to time slot T12.

Then, phase rotator 402 of PLC PHY block 42D multiplies the FFT-transformed received signal by phase vector PV2, so as to rotate the phase of each sub-carrier (step S23). Phase rotator 405 of PLC PHY block 42D makes a quadrant determination on each of the phase-rotated sub-carriers (step S24) as with steps 13 and 15 described in FIG. 18. Steps S25 and S26 are identical to steps S14 (or S17) and S18, and their descriptions are thus omitted.

In time slot T12, the phase vectors of the two request signals RSa and RSb are output as shown in FIG. 19 (a). As described above, however, modem 10C1 rotates the phases of the sub-carriers by phase vector PV2, and thus only detects the request signal RSb.

As described above, in the fourth embodiment, each modem 10 rotates the phases of the sub-carriers of the request signal RS output in the time slot by the phase vector corresponding to the time slot. This enables a reliable detection of request signals RS output in each time slot, even when there is a time difference between alternating current voltages ACs.

In the above-described fourth embodiment, descriptions have been provided for the case where different phase vectors are set for time slots T11,T12, . . . ,T17. However, it is not necessary to set different phase vectors for respective time slots. Phase vectors can be reliably differentiated when phase vectors having different rotation degrees (e.g., PV1 and PV2) are set at least for adjacent time slots (e.g., T11 and T12).

Fifth Embodiment

Communication system 100 according to the fifth embodiment is identical to that described in the first embodiment, and its descriptions are thus omitted. The communication apparatus according to the fifth embodiment is modem 10 described in the first embodiment, and its descriptions are thus omitted. The circuit configuration of modem 10 according to the fifth embodiment is identical to that of FIGS. 15 and 16, and its descriptions are thus omitted.

Figure 21:
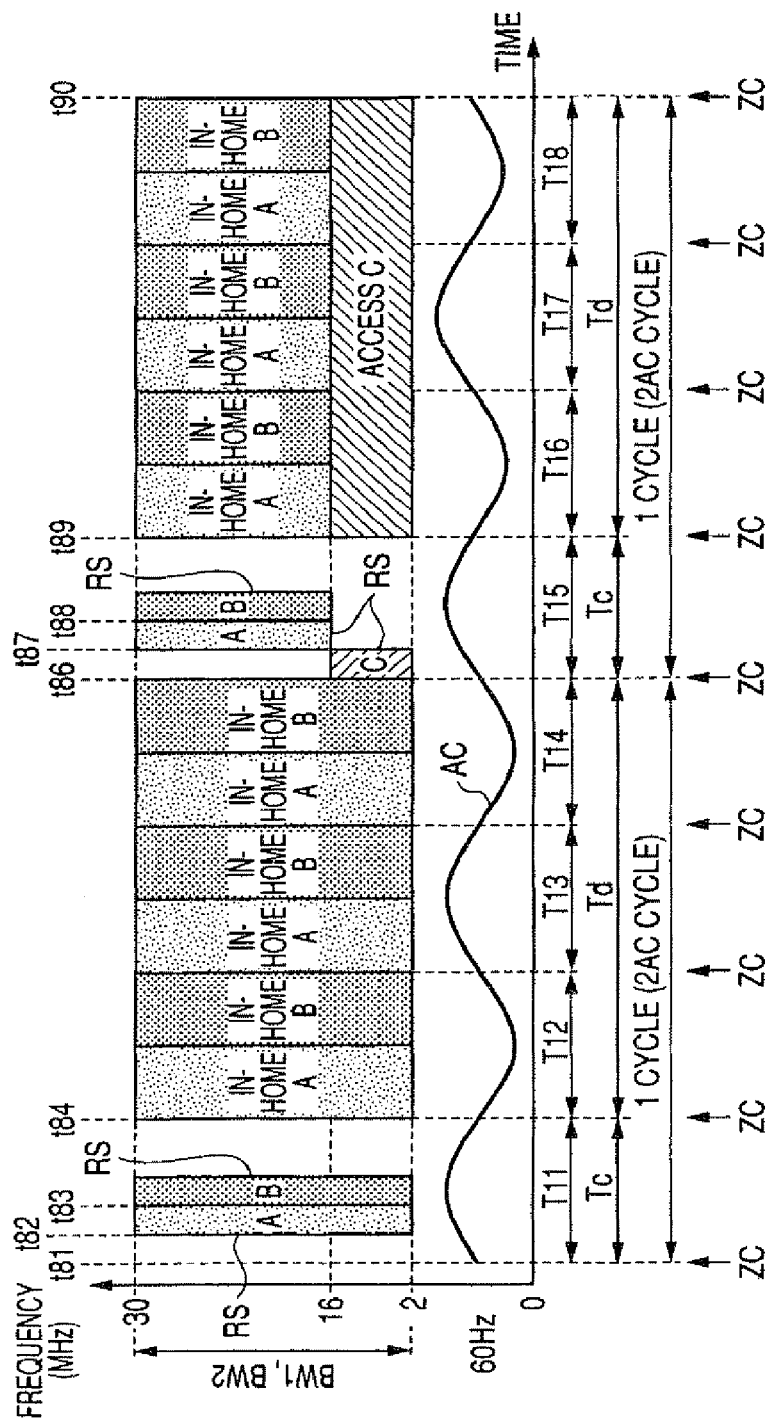
FIG. 21 is a time chart illustrating an operation example of a plurality of modems according to a fifth embodiment.
Figure 22:
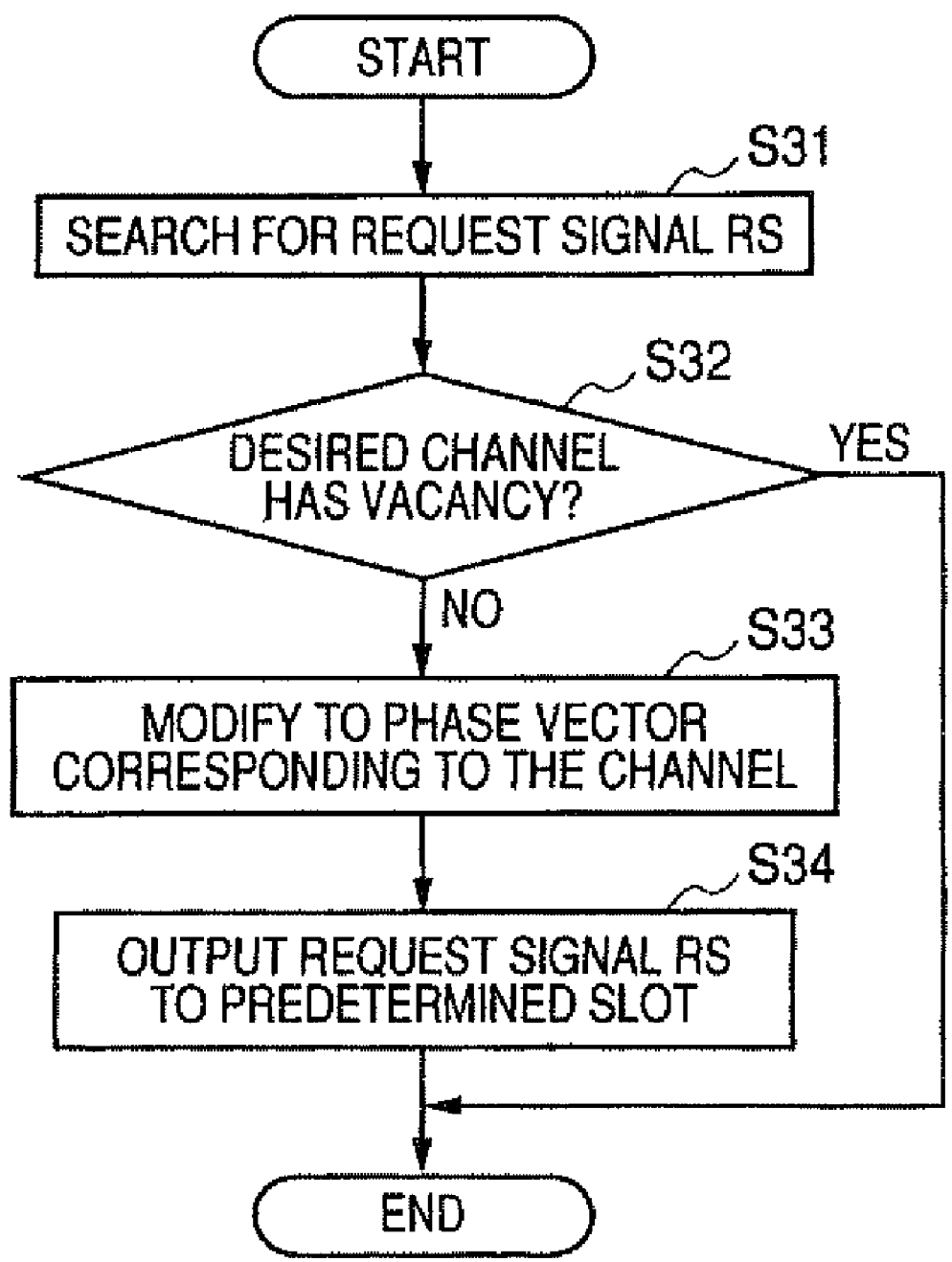
FIG. 22 is a flowchart illustrating a process of modifying a phase vector according to the fifth embodiment.

The following describes an example of a specific operation of modem 10 according to the fifth embodiment with reference to FIGS. 21 and 22. FIG. 21 is a time chart illustrating an operation example of a plurality of modems 10 according to the fifth embodiment. FIG. 22 is a flowchart illustrating a process of modifying a phase vector according to the fifth embodiment. The process of detecting a request signal RS is identical to that described with reference to FIG. 20 in the fourth embodiment.

The following describes a phase vector modification process performed by modem 10A1. Modem 10A1 searches for a request signal RS during control period Tc (step S31). For instance, it is assumed that controller 405 (see FIG. 16) of PLC PHY block 42D of modem 10A1 detects a zero cross ZC in zero cross circuit 63 (see FIG. 15) at time t81 shown in FIG. 21. Controller 405 determines whether or not the request signal RS is output between times t81 and t82. The carrier detection method is identical to that described in FIG. 18, and its descriptions are thus omitted.

In the fifth embodiment, each time slot during control period Tc is allocated to communication methods in the order of "C", "A" and "B". When data communication is performed through communication methods A, B, . . . , data period Td is time-divided into communication methods A, B, . . . . When data communication is performed through communication methods A, B, . . . and C, a frequency band of 16-30 MHz is allocated to communication methods A, B, . . . ; and a frequency band of 2-16 MHz is allocated to communication method C, thus dividing the frequency band used for power line communication. Memory 33 of each modem 10 stores data including these time slot allocations and which multiple-access scheme is employed when which request signal RS is output.

Modem 10A1 determines whether or not a desired channel has a vacancy (step S32). A channel only needs to be at least one of time and frequency bands, and a frequency band is used in this example. When modem 10A1 wishes to use the frequency band of 2-30 MHz and when no request signal RS is output between times t81 and t82, controller 405 of PLC PHY block 42D of modem 10A1 determines that the desired channel has a vacancy (step S32:Yes), since communication method C does not perform data communication during the following data period Td (between times t84 and t86), and terminates the process.

Accordingly, modem 10A1 performs data communication using the frequency band of 2-30 MHz without performing a phase vector modification process at time t84. In this case, since modem 10B1 outputs a request signal RS at time t83, modem 10A1 detects the request signal RS output from modem 10B1; and modems 10A1 and 10B1 alternately perform data communication during data period Td.

Further, in FIG. 21, the time durations of control period Tc and data period Td are equal to two cycles of commercial alternating current voltage AC. However, this is arbitrary as long as it is over ⅙ cycle of commercial alternating current voltage AC. Particularly, it is preferable that ½ cycle be used for a single-phase; and ⅙ or more cycle be used for three-phases. This is because it eliminates the need to determine whether commercial alternating current voltage AC is increased or decreased even when the waveform of the commercial alternating current voltage AC is inverted by an inverted insertion direction of a pair of plug terminals.

Time durations do not need to be equally divided for the data division of data communication. For instance, one of the time durations can be longer than the others. Although, in FIG. 21, data communication are performed three times for one communication method during one data period Td, the number of performing data communication is arbitrary.

At time t86, modem 10A1 starts the process described in FIG. 22, and again searches for a request signal RS (step S31). At the same time, modem 10A1 determines whether or not a desired channel (frequency band) has a vacancy (step S32). Controller 405 of PLC PHY block 42D of modem 10A1 determines whether or not a request signal RS is output between time t86 and t87. As shown in FIG. 21, since modem 10C1 outputs a request signal RS, controller 405 determines that the desired channel has no vacancy since communication method C performs data communication during the following data period Td between times t84 and t86 (step S32: No).

Controller 405 of PLC PHY block 42D of modem 10A1 modifies the phase vector corresponding to the channel (frequency band) (step S32). In this example, memory 33 stores the data related to phase vector PV1, which corresponds to the frequency band of 2-30 MHz, and the data related to phase vector PV2, which corresponds to the frequency band of 16-30 MHz. Further, phase vector PV1 is set for modem 10A1 as a phase vector between times t81 and t87.

Communication method C performs data communication (since the frequency band of 2-16 MHz cannot be used) during the following data period Td (between times t86 and t89), controller 405 of PLC PHY block 42D of modem 10A1 retrieves, from memory 33, the data related to the phase vector corresponding to the frequency band of 16-30 MHz. In other words, controller 405 retrieves, from memory 33, the data related to phase vector PV2; and phase rotator 408 of PLC PHY block 42D of modem 10A1 modifies the phase vector to PV2 (step S32). The phase vector modification process has been described in detail in the forth embodiment, and its descriptions are thus omitted.

Upon changing the phase vector, IFFT transformer 420 of PLC PHY block 42D of modem 10A1 performs IFFT transform on the sub-carriers whose phase vectors are rotated using PV2, so as to generate a transmitted signal. PLC PHY block 42D of modem 10A1 shuts off the frequency band of 2-16 MHz from the transmitted signal by controlling band-pass filter 45. The transmitted signal in the frequency band of 16-30 MHz is output as a request signal RS to power lines 2 via driver IC 46, coupler 27, power connector 12 and plug 3. Modem 10A1 outputs the request signal RS between times t87 and time t88 (step S33) and terminates the process. Modem 10B1 performs the same process, whose descriptions are thus omitted. Accordingly, during data period Td starting at time t89, modem 10C1 performs data communication in the frequency band of 2-16 MHz; and modems 10A1 and 10B1 perform data communication in the frequency band of 16-30 MHz.

Since modem 10A1 modifies a phase vector according to a frequency band for a request signal RS, other modems 10B1, 10C1, . . . can easily specify the frequency band used for the request signal RS even when the status of the transmission line is deteriorated. The same effects can be obtained when any other modem 10 differentiates the request signal RS.

As described above, in the fifth embodiment, a phase vector is modified according to a frequency band used for a request signal RS. Therefore, the frequency band used for the request signal RS can be smoothly specified despite changes of the transmission line status. As a result, a phase vector can be smoothly recognized even when the condition of the transmission line is deteriorated.

In the above-described third to fifth embodiments, descriptions have been provided for the case where a request signal RS is output at a timing relative to a zero cross as a reference point. However, such a timing does not need to be referenced to a zero cross. For instance, a timing can be arbitrary referenced as long as it is where commercial alternating current voltage AC reaches a predetermined voltage value (e.g., 10V) and it starts at the detected time point.

In the above-described first to fifth embodiments, descriptions have been provided for a power line as an example of a transmission line that performs transmission of a control signal and data communication. However, a line other than a power line can also be used. For instance, both wireless and wired cables can also be used as transmission lines. For a wired transmission line, for instance, various cables such as a coaxial cable, a telephone line and a speaker line can be used.

In the above-described first to fifth embodiments, a phase vector modification has been referred to as "rotating the phase of a sub-carrier". This is same as rotating a signal point on the complex coordinate plane. In addition, "phase vector" defined in the specification is a set of values indicating a rotation degree by which the signal point of each sub-carrier is rotated on the complex coordinate plane, each sub-carrier constituting a multi-carrier signal such as an OFDM signal. "Phase vector" is therefore a combination of values for equalizing time waveforms of the multi-carrier signal (suppressing a peak on the time axis). A phase vector has two types, i.e., a fixed value, which is a combination of predetermined values, and a variable value, which is a combination of varied values according to predetermined conditions. Such predetermined conditions include a cyclic shift and a random value. In addition, a phase vector is also referred to as a "carrier phase". In this case, a fixed value is referred to as a "deterministic carrier phase"; and a variable value is referred to as a "random carrier phase". The above-described request signal RS is also referred to as a CDFC (Commonly Distributed Coordination Function) signal.

The above-described first through fifth embodiments are individually described. However, these embodiments can also be combined as needed.

The communication apparatus and the communication method according to the present invention are useful for power line communication particularly in collective housings such as an apartment and a condominium because of its abilities to communicate while avoiding interference between signals when a plurality of communication apparatuses using different communication methods are connected to a common transmission line.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application Nos. 2005-297529 filed on Oct. 12, 2005, and 2006-114191 filed on Apr. 18, 2006, entire contents of which are expressly incorporated by reference herein.

What is claimed is:

1. A power-line communication apparatus for transmitting a multi-carrier signal including a plurality of sub-carriers to another communication apparatus through a power line, comprising:
   a phase rotation section configured to rotate phase of at least one sub-carrier among the plurality of sub-carriers, by use of a first phase vector or a second phase vector that differs from the first phase vector;
   a multi-carrier signal output section configured to output at least one of a first multi-carrier signal in which phase of at least one sub-carrier is rotated with the first phase vector, and a second multi-carrier signal in which phase of at least one sub-carrier is rotated with the second phase vector;
   a band setting section configured to set up at least one of a time band and a frequency band, on the basis of at least one of the first multi-carrier signal and the second multi-carrier signal, which are outputted to a power line by the multi-carrier signal output section; and
   a communication section configured to perform communication with another communication apparatus through a power line, by use of at least one of the time band and the frequency band, which are set up by the band setting section.

2. The communication apparatus according to claim 1, further comprising:
   a frequency band setting section configured to set up a frequency band that is used in the second multi-carrier signal,
   wherein, the phase rotation section sets up a rotation amount according to the frequency band that is set up by the band setting section, and changes the first phase vector to the second phase vector indicating the set rotation amount.

3. The communication apparatus according to claim 1, further comprising:
   a time point detection section configured to detect a time point where an alternating voltage transmitted to the power line reaches a predetermined voltage value,
   wherein, the multi-carrier signal output section outputs at least one of the first multi-carrier signal, and the second multi-carrier signal, by use of timing based on the time point detected by the time point detection section.

4. The communication apparatus according to claim 1, wherein the multi-carrier signal output section outputs the first multi-carrier signal repeatedly to a power line through a predetermined time, and outputs the second multi-carrier signal, by use of timing where the first multi-carrier signal was outputted.

5. The communication apparatus according to claim 1, wherein the phase rotation section sets up a rotation amount by use of a PN sequence, and changes the first phase vector, to the second phase vector indicating the set rotation amount.

6. The communication apparatus according to claim 5, wherein the PN sequence is a M sequence.

7. The communication apparatus according to claim 1, wherein the multi-carrier signal output section outputs the first multi-carrier signal in a first period, and output the second multi-carrier signal in a second period that differs from the first period.

8. An integrated circuit device for transmitting a multi-carrier signal including a plurality of sub-carriers, to another communication apparatus through a power line, comprising:
   a phase rotation section configured to rotate phase of at least one sub-carrier among the plurality of sub-carriers, by use of a first phase vector or a second phase vector that differs from the first phase vector;
   a multi-carrier signal output section configured to output at least one of a first multi-carrier signal in which phase of at least one sub-carrier is rotated with the first phase vector, and a second multi-carrier signal in which phase of at least one sub-carrier is rotated with the second phase vector;
   a band setting section configured to set up at least one of a time band and a frequency band, on the basis of at least one of the first multi-carrier signal and the second multi-carrier signal, which are outputted to a power line by the multi-carrier signal output section; and a communication section configured to perform communication with another communication apparatus through a power line, by use of at least one of the time band and the frequency band, which are set up by the band setting section.

9. A communication method for transmitting a multi-carrier signal including a plurality of sub-carriers, to another communication apparatus through a power line, comprising the steps of:
rotating phase of at least one sub-carrier among the plurality of sub-carriers, by use of a first phase vector or a second phase vector that differs from the first phase vector;
outputting at least one of a first multi-carrier signal in which phase of at least one sub-carrier is rotated with the first phase vector, and a second multi-carrier signal in which phase of at least one sub-carrier is rotated with the second phase vector;
setting up at least one of a time band and a frequency band, on the basis of at least one of the first multi-carrier signal and the second multi-carrier signal, which are outputted to a power line in the multi-carrier signal outputting step; and
performing communication with another communication apparatus through a power line, by use of at least one of the time band and the frequency band, which are set up in the band setting step.

* * * * *